(12) United States Patent
Yin et al.

(10) Patent No.: US 12,713,041 B2
(45) **Date of Patent: *Aug. 18, 2026**

(54) LUMINANCE BASED CODING TOOLS FOR VIDEO COMPRESSION

(71) Applicant: DOLBY LABORATORIES LICENSING CORPORATION, San Francisco, CA (US)

(72) Inventors: Peng Yin, Ithaca, NY (US); Guan-Ming Su, Fremont, CA (US); Taoran Lu, Santa Clara, CA (US); Tao Chen, Palo Alto, CA (US); Walter J. Husak, Simi Valley, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 18/341,720

(22) Filed: Jun. 26, 2023

(65) Prior Publication Data

US 2024/0430455 A1 Dec. 26, 2024

Related U.S. Application Data

(63) Continuation of application No. 17/334,631, filed on May 28, 2021, now Pat. No. 11,729,400, which is a (Continued)

(51) Int. Cl.

*H04N 19/186* (2014.01)
*H04N 19/117* (2014.01)

(Continued)

(52) U.S. Cl.

CPC ......... *H04N 19/186* (2014.11); *H04N 19/117* (2014.11); *H04N 19/136* (2014.11); *H04N 19/176* (2014.11); *H04N 19/198* (2014.11)

(58) Field of Classification Search

CPC .. H04N 19/198; H04N 19/117; H04N 19/136; H04N 19/176; H04N 19/186

See application file for complete search history.

(56) References Cited

U.S. PATENT DOCUMENTS 6,907,079 B2 6/2005 Gomila
8,982,963 B2 3/2015 Gish (Continued)

FOREIGN PATENT DOCUMENTS

CN 102388612 3/2012
JP 09-102744 4/1997

(Continued)

OTHER PUBLICATIONS

"H.265: High Efficiency Video Coding" ITU, Jun. 7, 2013.

(Continued)

*Primary Examiner* — On S Mung

(57) ABSTRACT

Sample data and metadata related to spatial regions in images may be received from a coded video signal. It is determined whether specific spatial regions in the images correspond to a specific region of luminance levels. In response to determining the specific spatial regions correspond to the specific region of luminance levels, signal processing and video compression operations are performed on sets of samples in the specific spatial regions. The signal processing and video compression operations are at least partially dependent on the specific region of luminance levels.

7 Claims, 8 Drawing Sheets

Related U.S. Application Data continuation of application No. 15/118,083, filed as application No. PCT/US2015/016549 on Feb. 19, 2015, now Pat. No. 11,032,553.

(60) Provisional application No. 61/944,909, filed on Feb. 26, 2014.

(51) Int. Cl.

| | |
|---|---|
| ***H04N 19/136*** | (2014.01) |
| ***H04N 19/176*** | (2014.01) |
| ***H04N 19/196*** | (2014.01) |

(56) References Cited

U.S. PATENT DOCUMENTS

| | | | | |
|---|---|---|---|---|
| 2002/0087934 | A1 | 7/2002 | Kondo | |
| 2005/0013373 | A1 | 1/2005 | Lin | |
| 2008/0187235 | A1 | 8/2008 | Wakazono | |
| 2008/0193032 | A1 | 8/2008 | Segall | |
| 2012/0026288 | A1 | 2/2012 | Tourapis | |
| 2012/0051635 | A1 | 3/2012 | Kunkel | |
| 2013/0077697 | A1 | 3/2013 | Chen | |
| 2013/0188733 | A1 | 7/2013 | Van Der Auwera | |
| 2013/0259141 | A1 | 10/2013 | Van Der Auwera | |
| 2013/0321700 | A1 | 12/2013 | Cote | |
| 2015/0092847 | A1 | 4/2015 | Su et al. | |
| 2015/0117791 | A1 | 4/2015 | Mertens | |
| 2015/0189319 | A1 | 7/2015 | Pu | |
| 2015/0326883 | A1* | 11/2015 | Rosewarne | H04N 19/136 375/240.18 |
| 2015/0341675 | A1 | 11/2015 | Su et al. | |
| 2016/0014420 | A1 | 1/2016 | Su et al. | |
| 2016/0021379 | A1 | 1/2016 | Minezawa | |
| 2016/0134872 | A1 | 5/2016 | Su | |
| 2016/0366422 | A1* | 12/2016 | Yin | H04N 19/70 |

FOREIGN PATENT DOCUMENTS

| | | |
|---|---|---|
| JP | 10-84549 | 3/1998 |
| JP | 2001231038 | 8/2001 |
| JP | 2008113439 | 5/2008 |
| JP | 2010074597 | 4/2010 |
| WO | 1999045713 | 9/1999 |
| WO | 20130103522 | 7/2013 |

OTHER PUBLICATIONS

"ISO/IEC FDIS 23008-2", International Organization for Standardization, May 14, 2013, retrieved Jun. 14, 2013.

Atzori, L. et al."Adaptive Anisotropic Filtering (AAF) for Real-Time Visual enhancement of MPEG-Coded Video Sequences" IEEE Transactions on Circuits and Systems for Video Technology, vol. 12, No. 5, May 2002.

Basse, H. et al. "Proposed Standardization of XYZ Image", MPEG doc M30167, Vienna, Austria, Jul. 2013.

Flynn, D. et al."HEVC Range Extensions Draft 6" JCT-VC Meeting Jan. 9-17, 2014, San Jose, Joint Collaborative Team on Video Coding of ISO/IEC JTC1/SC29/WG11 and ITU-T SG16.

Hu, H. et al."Classification-based Hybrid Filters for Image Processing" Proc. of SPIE International Society for Optical Engineering, vol. 6077, Jan. 18, 2006, pp. 1-6.

Hu, H. et al."Classification-based Hybrid Filters for Image Processing" Proc. of SPIE, Jan. 31, 2006, vol. 6077.

ITU-T and ISO/IEC JTC 1, "Advanced Video Coding for Generic Audio-Visual Services", ITU T rec. H.264 and ISO/IEC 14496-10 (AVC).

Miller, S. et al."Perceptual Signal Coding for More Efficient Usage of Bit Codes" SMPTE Motion Imaging Journal, May/Jun. 2013.

Naccari, M. et al On Intensity Dependent Quantisation in the HEVC Codec, Joint Collaborative Team on Video Coding of ITU-T SG 16 WP 3 and ISO/IEC JTC 1/SC 29 WG 9th Meeting, Geneva, CH, Apr. 7-May 20, 2012.

Sharman, K. et al."AHG 5 and 18: Internal Precision for High Bit Depths" JCTVC-N0188, Vienna, AT, Jul. 2013.

SMPTE ST 428-1:2006, D-Cinema Distribution Master (DCDM)—Image Characteristics.

Sullivan, G. et al."Overview of the High Efficiency Video Coding (HEVC)Standard" IEEE Transactions on Circuits and Systems for Video Technology, vol. 22, Issue 12, pp. 1649-1668, Dec. 2012.

* cited by examiner

| Luminance Levels (nit) | EDR Normalized Code Words | BT1886 Normalized Code Words |
|---|---|---|
| 5 | 0.2478 | 0.0399 |
| 10 | 0.2997 | 0.0540 |
| 100 | 0.5081 | 0.1448 |
| 1000 | 0.7518 | 0.3817 |
| 2000 | 0.8274 | 0.5102 |
| 4000 | 0.9026 | 0.6819 |
| 10000 | 1 | 1 |

FIG. 2 determine a luminance range supported by a video signal 402 determine, based at least in part on the luminance range supported by the video signal, thresholds and values of operational parameters used in signal processing operations, internal precisions of one or more of the thresholds and the values of operational parameters depending on the luminance range supported by the video signal 404 select, from the thresholds and values of operational parameters determined based at least in part on the luminance range supported by bit depth of the video signal, a specific set of thresholds and values of operational parameters for applying to one or more spatial regions of a video image represented in the video signal 406

FIG. 4A receive sample data and metadata related to a plurality of spatial regions in images 452 determine whether specific spatial regions in the plurality of spatial regions correspond to a specific region of luminance levels 454 in response to determining the one or more specific spatial regions correspond to the specific region of luminance levels, perform one or more signal processing operations on sets of samples in the specific spatial regions, the signal processing operations being at least partially dependent on the specific region of luminance levels 456

FIG. 4B analyze the statistics of a video signal 482 determine, based at least in part on luminance levels in the video signal, thresholds and values of operational parameters used in signal processing operations, internal precisions of one or more of the thresholds and the values of operational parameters depending on the luminance region of the video signal 484 determine filter parameters for a sparse finite-impulse-response (FIR) filter 486

FIG. 4C

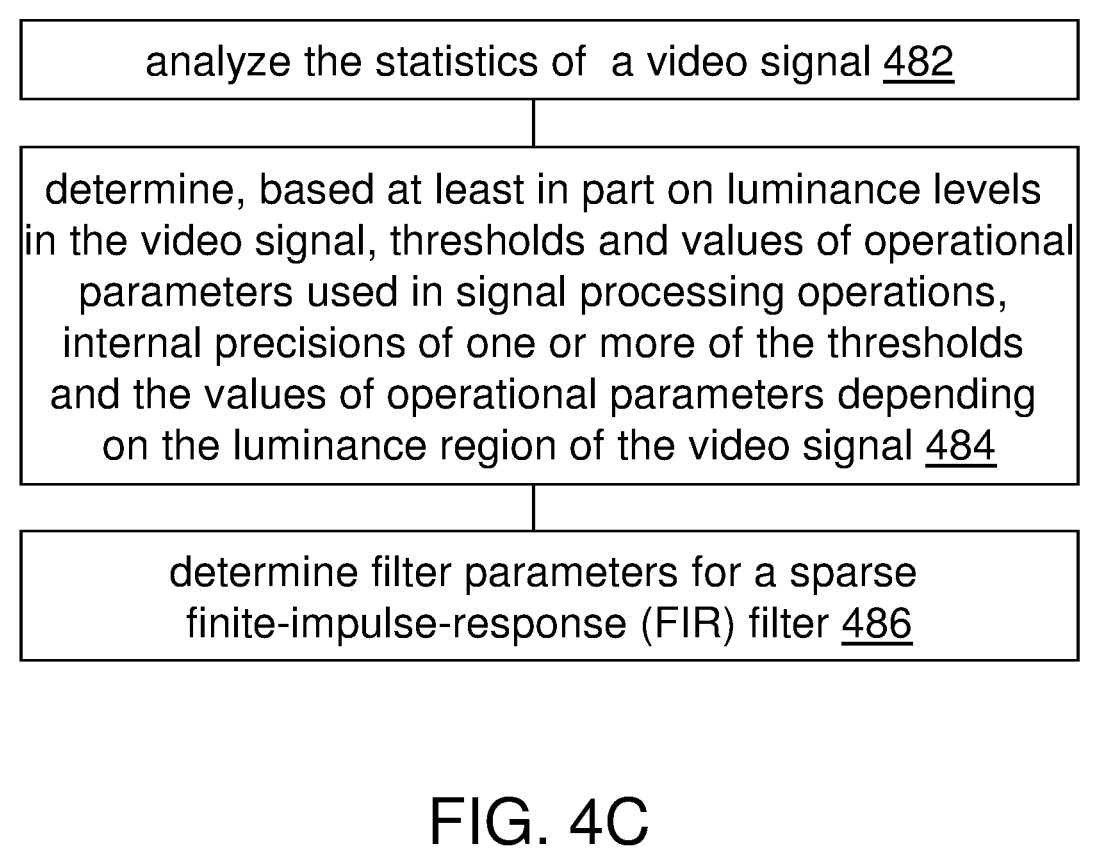

500
MAIN MEMORY 506
ROM 508
STORAGE DEVICE 510
BUS 502
PROCESSOR 504
COMMUNICATION INTERFACE 518
NETWORK LINK 520
LOCAL NETWORK 522
HOST 524
ISP 526
INTERNET 528
SERVER 530
DISPLAY 512
INPUT DEVICE 514
CURSOR CONTROL 516

LUMINANCE BASED CODING TOOLS FOR VIDEO COMPRESSION

CROSS-REFERENCE TO RELATED APPLICATIONS

This application is a continuation of U.S. patent application Ser. No. 17/334,631, filed on May 28, 2021, which is a continuation of U.S. patent application Ser. No. 15/118,083, filed on Aug. 10, 2016, now U.S. Pat. No. 11,032,553 (issued on Jun. 8, 2021), which is the U.S. national entry of PCT Application Ser. No. PCT/US2015/016549, filed on Feb. 19, 2015, which claims the benefit of priority to the U.S. Provisional Patent Application Ser. No. 61/944,909, filed on Feb. 26, 2014, each of which is hereby incorporated by reference in its entirety.

TECHNOLOGY

The present invention relates generally to image processing, and in particular, to encoding and decoding video images.

BACKGROUND

As scene-referred high dynamic range (HDR) images captured by high-end cameras may comprise large amounts of data not optimal for transmission, storage, and display, these images are typically converted into post-production images that have much smaller amounts of data and that can be delivered to downstream devices at a variety of available bit rates and to be rendered on a display. Traditional displays (e.g. consumer HDTVs, desktop monitors in market nowadays) usually can only support peak luminance of 100 nits with BT. 709 colors. Therefore, the state-of-art video coding standards such as High Efficiency Video Coding (HEVC), H.264/AVC, etc., are developed in consideration to preserve best visual quality on such displays. The next generation modern displays can support much higher peak luminance (e.g. 4,000 nits) with wider color gamut than BT. 709. To take advantage of advances in technology that allow modern displays to render images with significant improvements in various quality characteristics as compared with less modern displays, an adopted video coding standard may be enhanced to code images with higher dynamic range and wider color gamut than that of BT. 709.

Due to limited bit depths and other factors such as lossy compression, the post-production images after compression may comprise significant coding errors as compared with scene-referred HDR images. These coding errors may cause noticeable visual artifacts when the post-production images are rendered on a modern display, especially in certain spatial regions of the rendered images such as highlights (or bright areas) or shadow details (or dark areas).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2 illustrates example mappings between sets of code words and a set of luminance levels;

FIG. 4A through FIG. 4C illustrate an example process flow; and

DESCRIPTION OF EXAMPLE EMBODIMENTS

Figure 1A:
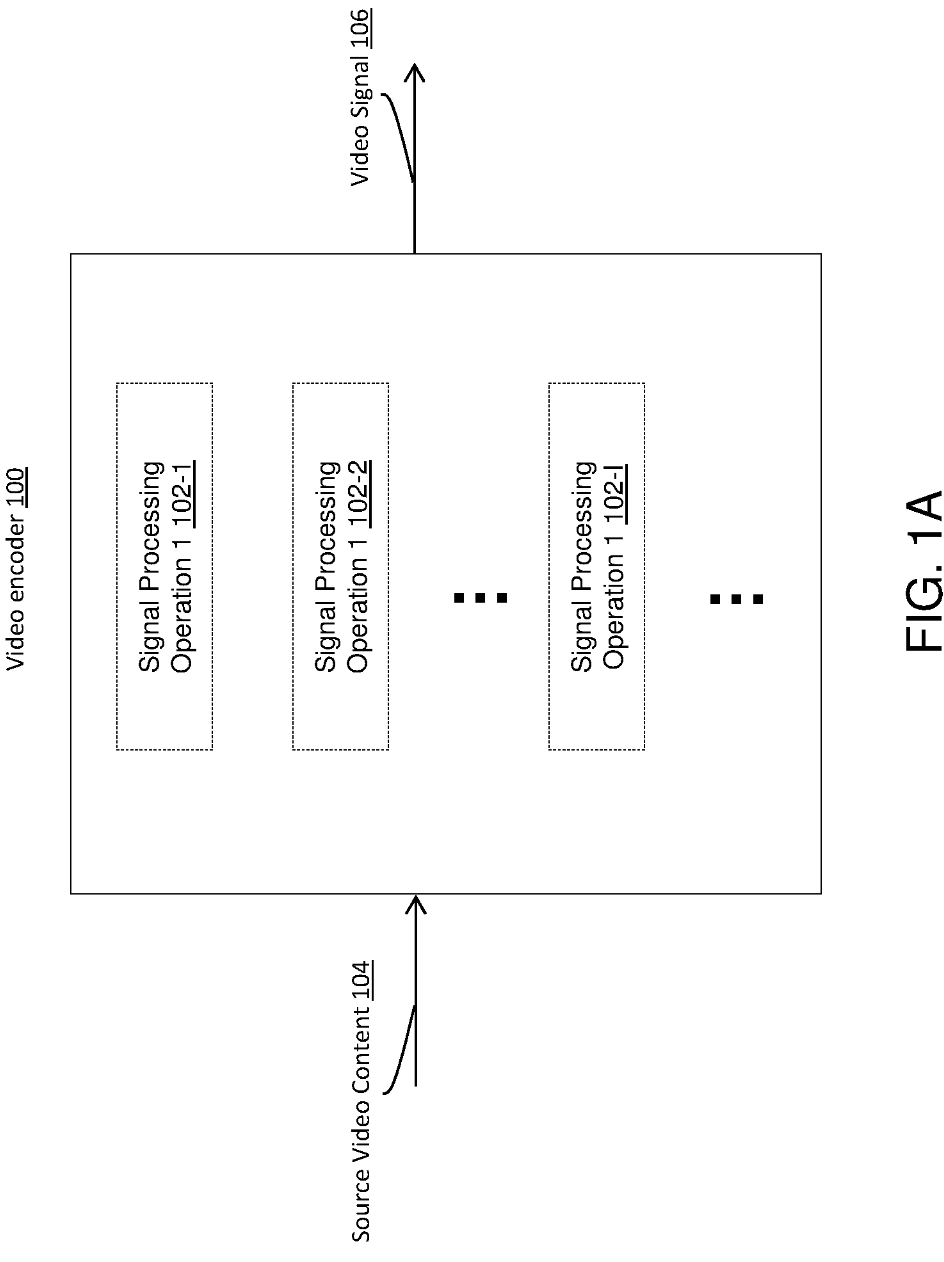
FIG. 1A and FIG. 1B illustrate an example video encoder and an examine video decoder, respectively.

Example embodiments, which relate to encoding and decoding video images, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. EXAMPLE VIDEO CODECS
3. NON-LINEAR MAPPINGS AND CODING ERRORS
4. INTERNAL PRECISION
5. INTER-PREDICTION/MOTION COMPENSATION
6. INTRA PREDICTION
7. TRANSFORM, QUANTIZATION AND QP MAPPING
8. ENTROPY CODING
9. DEBLOCKING
10. SAMPLE ADAPTIVE OFFSET
11. DE-BANDING FILTERING
12. OTHER EXAMPLE OPERATIONS
13. EXAMPLE PROCESS FLOWS
14. IMPLEMENTATION MECHANISMS—HARDWARE OVERVIEW
15. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be applied to encoding and/or decoding video images that support any of a variety of combinations of color gamut and/or dynamic ranges. For example, these techniques can be applied to encoding and/or decoding video images that support relatively wide color gamut and/or a high dynamic range (e.g., an enhanced dynamic range or EDR, a visual dynamic range or VDR, HDR, etc.). These techniques can also be applied to encoding and/or decoding video images that support relatively narrow color gamut and/or narrow dynamic range (e.g., standard dynamic range or SDR, etc.). Additionally, alternatively, or optionally, these video images may be encoded in or decoded from one or more of a variety of possible video formats. These video images may be transmitted or received as a video signal at one or more of a variety of available bit rates.

Some or all of the techniques as described herein may be used to process (e.g., encode, decode, etc.) video images in an extended dynamic range (EDR) signal comprising code words generated with a perceptual quantizer, a non-perceptual quantizer, etc. In some embodiments, the EDR signal may, but is not limited to only, comprise code words generated by a perceptual quantizer that represent quanta (e.g., reference grayscale levels, etc.) of human perceptions in a human perceptual model. In some embodiments, the EDR signal may support a peak brightness level of 10,000 nits (or cd/m$^2$) and a dark black level of 0.005 nits, with a contrast ratio of 2,000,000:1. Additionally, optionally, or alternatively, the EDR signal may support a color gamut (e.g., significantly, etc.) larger than that of BT.709.

Some or all of the techniques as described herein may also be used to process (e.g., encode, decode, etc.) video images in an SDR signal. In some embodiments, the SDR signal may support a peak brightness level of approximately 50 to 100 nits, with a contrast ratio of less than 3 log units in luminance (or dynamic range). Additionally, optionally, or alternatively, the SDR signal may support a color gamut comparable to that of BT. 709.

Techniques as described herein can be applied to encoding and/or decoding video images that support any of a variety of color spaces. For example, these techniques may be used to process (e.g., encode, decode, etc.) video images in one or more of an RGB color space, an YCbCr space, an XYZ space, and YDzDx space, a mixed color space, a color space with three or more primary colors, etc. These video images may comprise code words representing component values of one or more color spaces.

In some embodiments, video images processed under techniques as described herein may comprise code words (e.g., luminance levels, luma values, EDR code words, etc.) indicating relative brightness levels or absolute brightness levels. A relative brightness level may, but is not limited only to, be a unitless quantity in relation to a reference value such as a dark black level, etc. An absolute brightness level may, but is not limited only to, be a quantity in terms of nits, etc.

Techniques as described herein can be applied to encoding and/or decoding video images that support any of a variety of bit depths of code spaces in which code words used to encode or decode video images reside. In some embodiments, bit depths of a video signal or a code space for code words used to encode or decode the video signal are subject to limitations set by industry-adopted standard interfaces. As a result, the video signal may contain quantization errors, clippings, etc.

As used herein, the term "bit depth" refers to the number of bits provided in a coding space that provides available code words to encode or quantize image data; an example of low bit depth is 8 bits; an example of high bit depth is 12 bits or more. In particular, the term "a low bit depth" or "a high bit depth" does not refer to the least significant bits or the most significant bits of a code word.

In some embodiments, video images are encoded using one or more of a variety of signal encoding methods (i.e., transfer functions, e.g., gamma encoding based on BT. 1886, perceptual quantizer based on Society of Motion Picture and Television Engineers ST.2084 (SMPTE 2084), etc.) into a video signal of a particular bit depth (e.g., an n-bit video signal, a 8-bit signal, a 10-bit signal, a 12-bit signal, a 14+ bit signal, etc.). The signal encoding methods may be configured to evenly distribute and/or minimize visual artifacts across a large part or all of a wide dynamic range supported by the video signal.

Under some approaches, video signal processing operations may interpolate code words, apply offsets to code words, etc., based on relationships, parameters, functions, filters, etc., that are independent of variations in luminance levels (e.g., variations in average luminance levels of slices, CTUs, CUs, PUs, TUs, blocks, etc.).

In contrast, techniques as described herein may be used to modify or alter characteristics of these signal processing operations so that video images are processed in a way that is dependent on variations in luminance levels (e.g., variations in average luminance levels of video coding sequences, scenes, one or more pictures, slices, coding tree units (CTUs), coding units (CUs), prediction units (PUs), transform units (TUs), blocks in one or more of the foregoing entities, etc.).

Specifically, one or more signal processing tools, operations, processes, modules, etc., under techniques as described herein operate with dependence on luminance levels as determined from one or more samples or one or more sets of samples in one or more video coding sequences, one or more scenes, one or more pictures, one or more slices, one or more CTUs, one or more CUs, one or more PUs, one or more TUs, one or more blocks, etc., in a video signal.

For the purpose of illustration only, a video signal that is encoded with a perceptual quantizer may sometimes be used to explain or describe techniques as described herein. However, it should be noted that techniques as described herein may be applied in various embodiments to a video signal that is encoded by other quantizers or quantization methods other than a perceptual quantizer or a perceptual quantization method.

For the purpose of illustration only, several signal processing operations, methods, processes, modules, etc., related to HEVC coding may sometimes be used to explain or describe techniques as described herein. However, it should be noted that techniques as described herein may be applied in various embodiments to other signal processing operations, methods, processes, modules, etc. These other signal processing operations, methods, processes, modules, etc., may or may not be related to HEVC.

Techniques as described herein can be applied to video signals formatted with one or more of a variety of video coding syntaxes. A video coding syntax as described herein may comprise one or more syntax elements that allows signal processing operations, methods, processes, modules, etc., to be adapted according to luminance levels as determined from one or more samples or one or more sets of samples.

In some embodiments, a specific luminance level for a specific set of samples in a specific CTU (which may also be a largest CU or LCU, or alternatively may be further partitioned into multiple CUs), a specific coding unit, etc., can be determined by a video encoder and then signaled to a video decoder in a video signal, for example, as one or more syntax elements in the video signal. In some embodiments, a specific luminance level for a specific set of samples can be determined by a video decoder, a video encoder, etc., for example, based on one or more coefficient (e.g., a DC coefficient in DCT coefficients, etc.) in a transform domain, as derived from the specific set of samples.

Example syntax elements may include, but are not limited only to, any of one or more syntax elements for signaling one or more specific luminance levels within one or more specific sets of samples in one or more specific CTUs, one or more CUs, etc., one or more syntax elements for switching chroma interpolation filters based on luminance levels, one or more syntax elements for applying non-linear luminance compensation filtering (e.g., smoothing, with low-pass filters, etc.), one or more syntax elements for adapting thresholds and filtering based on luminance levels in intra prediction, one or more syntax elements for adapting bit-depths of precision based on luminance levels for operational parameters in transform related computations, one or more syntax elements for applying different QP mapping tables based on luminance levels, one or more syntax elements for adjusting CABAC (context-adaptive binary arithmetic coding), Huffman encoding such as context-adaptive variable length coding (CAVLC) in H.264, etc., Golomb coding, etc., based on luminance levels (e.g., bright areas, mid-tone areas, dark areas, etc.), one or more syntax elements for modifying deblocking filters based on luminance levels, etc.

For the purpose of illustration only, a dynamic range supported by samples in video images may sometimes be divided into two or three ranges (e.g., bright areas, mid-tone areas, dark areas, etc.) of luminance levels. The two or three ranges of luminance levels in examples described below may be indicated by a 2-bit luminance indicator, a Huffman codeword, etc. However, it should be noted that techniques as described herein may be applied to more than three ranges of luminance levels, for example, as indicated by a (e.g., 2-bit, 3-bit, 4-bit, etc.) luminance indicator, and may even be applied to luminance levels directly without partitioning the luminance levels into different regions.

In some example embodiments, mechanisms as described herein form a part of a media processing system, including but not limited to any of: a video encoding device, a video decoding device, a handheld device, a game machine, a television, a laptop computer, a netbook computer, tablet computer, a cellular radiotelephone, an electronic book reader, a point of sale terminal, a desktop computer, a computer workstation, a computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. EXAMPLE VIDEO CODECS

Techniques (e.g., algorithms, etc.) as described herein can be used by a video encoder to encode source video content into a video signal that preserves visual details of the source video content. In some embodiments, the source video content is originally encoded with the source code words in a source encoding format (e.g., as defined by a VDR specification, etc.) based on video encoding techniques (e.g., VDR encoding techniques developed by Dolby Laboratories, Inc., San Francisco, California, etc.). The video signal generated by a video encoder as described herein can be transmitted directly or indirectly to or received by a wide variety of downstream devices.

A downstream device (e.g., a video decoder, etc.) that supports relatively wide dynamic range display operations can derive and/or render a wide dynamic range version of the source video content based on the received video signal. Additionally, optionally, or alternatively, a downstream device that supports relatively low dynamic range display operations can derive and/or render a decoded low dynamic range version with visual details of the source video content based on at least a portion of the received video signal.

FIG. 1A illustrates an example video encoder 100 configured to generate, based at least in part on source video content 104, a video signal 106. In some embodiments, the video signal (106) conforms to a video signal structure, video coding syntax, etc., as specified by a video coding specification (e.g., standard-based, proprietary, an extension of a video coding specification or a standard, etc.).

The source video content (104) may comprise one or more video coding sequences of input images. A video coding sequence may represent one or more scenes each of which comprises a plurality of (e.g., input, decoded, etc.) images. An input image, an intermediate image, a decoded image, an output image, etc., may be in one of a variety of different color spaces.

The video signal (106) can be provided by the video encoder (100) to a downstream device (e.g., a video decoder such as 150 of FIG. 1B, etc.) in any of a variety of mechanisms (e.g., internet, intranet, broadcast, Blu-ray, etc.).

The video encoder (100) may comprise a plurality of coding modules (e.g., 102-1, 102-2, . . . 102-I, . . . , etc.) configured to perform a number of video signal processing operations for the purpose of generating the video signal (106). Examples of the video signal processing operations performed by the video encoder (100) may include, but are not limited to only: any of source video content signal encoding format conversion, transform, quantization, inverse transform, intra prediction (or intra-picture prediction), inter prediction (or inter-picture prediction), motion compensation, deblocking, sample adaptive offset (SAO) filtering, debanding filtering, entropy coding, etc. Under techniques as described herein, at least some of the video signal processing operations performed by the video encoder (100) are luminance dependent. Examples of luminance-dependent operations performed by the video encoder (100) may include, but are not limited to only: any of inline operations that are to be performed by downstream devices that receive and process the video signal (106), encoder-specific operations, standard-defined operations (e.g., HEVC defined encoder operations, HEVC defined inline operations, H.264/AVC defined operations, etc.), etc.

The video encoder (100) can be configured to partition the source video content (104) into partitions of various hierarchical levels such as one or more of video coding sequences, scenes, pictures, slices, coding tree units (CTUs), coding units (CUs), etc. Various video signal processing operations performed by the coding modules (102-1, 102-2, . . . 102-I, . . . ) can be operated at various levels of video coding sequences, scenes, pictures, slices, coding tree units (CTUs), coding units (CUs), etc.

Examples of spatial regions to partition a picture decoded from the source video content (104) may include, but are not limited only to: any of slices, CTUs, CUs, etc. In some implementations, CTUs comprise luma CTBs and chroma CTBs. When input format is 4:2:0, a luma CTB covers a rectangular picture area of L×L samples of the luma component and the corresponding chroma CTBs cover each L/2×L/2 samples of each of the two chroma components. The value of L may be equal to 16, 32, or 64 as determined by a syntax element specified in a sequence parameter set (SPS) in the video coding syntax. Luma and chroma CTBs can be directly used as coding blocks (CBs) or can be further partitioned into multiple CBs.

One or more of the signal processing operations performed by the coding modules (102-1, 102-2, . . . 102-I, . . . ) in the video encoder (100) may be implemented using one or more of a plurality of codecs, including, but not limited to, any combination of: H.264/AVC/HEVC, MPEG-2, VP8, VC-1, and/or others.

Figure 1B:
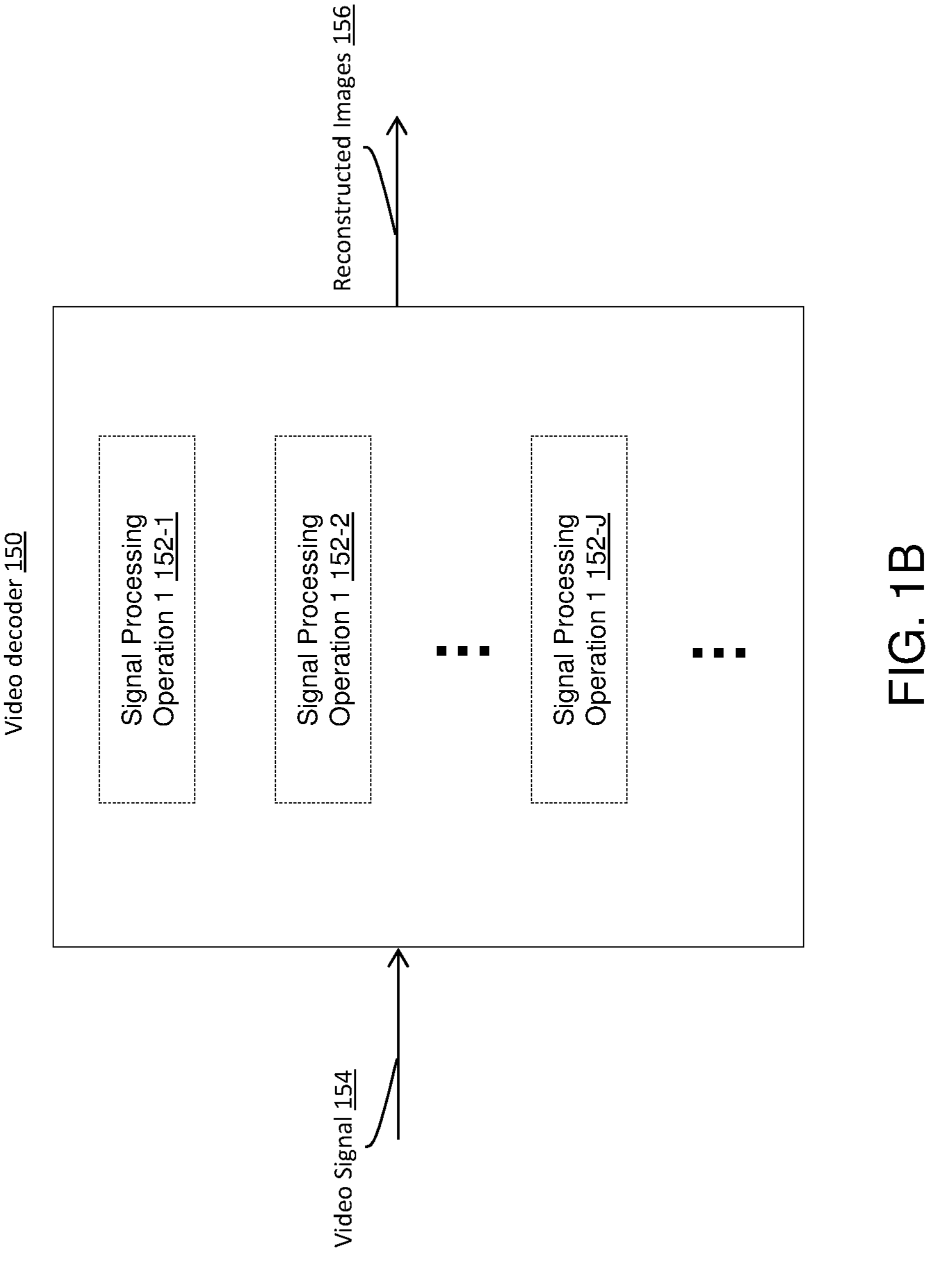

A video signal (e.g., coded bitstream, etc.) comprising video content can be received by a downstream device such as a video decoder 150 of FIG. 1B, etc. In some embodiments, the video decoder (150) comprises a plurality of coding modules (e.g., 152-1, 152-2, . . . 152-J, . . . , etc.) configured to perform a number of video signal processing operations for the purpose of generating video images 156 (e.g., for rendering, etc.) that represent a reconstructed version of source images in source video content that was used to generate the video signal (106).

The video decoder (150) may comprise a plurality of coding modules 152-1 through 152-J configured to perform a number of video signal processing operations for the purpose of generating the video images (156). Examples of the video signal processing operations performed by the video decoder (150) may include, but are not limited to only: any of video signal decoding/decompression (e.g., entropy decoding, etc.), inverse quantization, inverse transform, intra prediction, inter prediction, motion compensation, deblocking, sample adaptive offset (SAO) filtering, debanding filtering, entropy coding, etc. Under techniques as described herein, at least some of the video signal processing operations performed by the video decoder (150) are luminance dependent. Examples of luminance-dependent operations performed by the video decoder (150) may include, but are not limited to only: any of inline operations that are to be performed by an upstream device that generates the video signal (106), decoder-specific operations, standard-defined operations (e.g., HEVC decoder operations, H.264/AVC decoder operations, etc.), etc.

The video decoder (150) can be configured to decode the video signal (106) into sample data, metadata, etc., in partitions of various hierarchical levels such as one or more of video coding sequences, scenes, pictures, slices, coding tree units (CTUs), coding units (CUs), etc. Various video signal processing operations performed by the coding modules (152-1, 152-2, . . . 152-I, . . . ) can be operated at various levels of video coding sequences, scenes, pictures, slices, coding tree units (CTUs), coding units (CUs), etc.

One or more of the signal processing operations performed by the coding modules (152-1, 152-2, . . . 152-J, . . . ) in the video decoder (150) may be implemented using one or more of a plurality of codecs, including, but not limited to, any combination of: H.264/AVC/HEVC, MPEG-2, VP8, VC-1, and/or others.

In an example embodiment, an input image, an intermediate image, a predicted image, a residual image, an output image, etc., is a (e.g., 10+ bit, etc.) YCbCr image in an YCbCr color space. In an example, each pixel represented in the input image comprises code words for all components (e.g., luminance components Y, chroma components Cb and Cr, etc.) defined for a color space (e.g., an YCbCr color space, etc.). Each code word comprises upsampled or downsampled code words for one or more of the components in the color space.

In an example embodiment, the video encoder (100) or the video decoder (150) is configured to transform code words of an input image, an intermediate image, a predicted image, a residual image, etc., from a first color space (e.g., an RGB color space, etc.) to a second different color space (e.g., a YCbCr color space, etc.).

In an example embodiment, the video encoder (100) or the video decoder (150) is configured to downsample or upsample an image in a first sampling format (e.g., in a 4:4:4 sampling format, etc.) to a second different sampling format (e.g., in a 4:2:0 sampling format, etc.).

In some embodiments, the video encoder (100) or the video decoder (150) may implement a structure of multiple layers in a video signal (e.g., 106, etc.). The multiple layers may comprise a base layer and one or more enhancement layers. The base and enhancement layers comprise image data derived from the same source images in the source video content (104). Image data in the base layer contains compressed image data of a low or partial dynamic range, which may or may not be optimized for rendering on displays of a relatively low dynamic range such as a standard dynamic range or SDR. Image data in the multiple layers in combination contains compressed images of a wide dynamic range, which can be decoded and viewed on displays of a relatively wide dynamic range such as a VDR, etc.

The terms "VDR" or "visual dynamic range" and "EDR" (or "enhanced dynamic range") as used herein may refer to a dynamic range wider than a standard dynamic range, and may include, but is not limited to, a wide dynamic range up to the instantaneously perceivable dynamic range and color gamut which human vision can perceive at an instant. For example, EDR may refer to an intermediate dynamic range (e.g., 0.005 nit to 20,000 nits, etc.) that is larger than SDR (e.g., <=100 nits, etc.).

A video codec (e.g., the video encoder 100 of FIG. 1A, the video decoder 150 of FIG. 1B, etc.) as described herein may be implemented with one, two or more lower bit depth (e.g., 8 bits, etc.) codecs (e.g., gamma-domain codecs, etc.) in the multiple layers in order to support higher bit depth (e.g., 12+ bits, etc.) images in the multiple layers as a whole and to support lower bit depth (e.g., 8 bits, etc.) images in the base layer.

3. NON-LINEAR MAPPINGS AND CODING ERRORS

In some embodiments, code words may be decoded by a video decoder (e.g., 150 of FIG. 1B, etc.) from a video signal to reconstruct video images that were used by a video encoder (e.g., 100 of FIG. 1A, etc.) to encode the video signal. The decoded code words can be converted into luminance levels based on a mapping between a set of (e.g., defined, reference, designated, EDR, PQ, etc.) code words and a set of luminance levels spanning over a range of luminance levels.

FIG. 2 illustrates example mappings between two sets of code words and a set of luminance levels. For the purpose of illustration only, the luminance levels are represented in units of nits, whereas code words in each of the two sets of code words are normalized in a range of 0 to 1. The first of the two sets of code words may be generated by a perceptual quantizer for use in an EDR video signal, and represent quanta (e.g., reference grayscale levels, etc.) of human perceptions in a human perceptual model. The second of the two sets of code words may represent code words such as used in a BT. 1886 compliant video signal.

In some embodiments, a mapping between a set of luminance levels and a set of code words such as EDR code words, etc., may not be a linear mapping in which luminance levels are linearly dependent on, or even scaled based on a power function with, (e.g., numeric values of) code words. As illustrated in FIG. 2, in the example mapping between the set of luminance levels and the set of EDR code words, almost 25% of the total EDR code words in a (e.g., 12 bit, 14 bit, etc.) code space are designated for luminance levels smaller than 5 nits; about 50% of the total EDR code words are designated for luminance levels lower than 100 nits; and about 75% of the total EDR code words are designated for luminance levels lower than 1000 nits. Thus, only about 25% of the total EDR code words are designated for luminance levels larger than 1000 nits. In addition, for luminance levels larger than 4000 nits, only 10% of the total EDR code words are designated.

Video compression is used to adapt a video signal to one or more available bit rates in transmission of the video signal. However, video compression often introduces additional quantization errors in code words used to encode the video signal. Quantization errors in the code words in turn cause errors in luminance levels to which the code words are mapped.

Variations in amounts of errors in luminance levels as caused by quantization errors in code words are linked to a degree of non-linearity of a mapping between a set of luminance levels and a set of code words—in some embodiments, the degree of non-linearity of a mapping may be measured or indicated by a slope of the mapping at a particular luminance level, etc.

Techniques as described herein can be used to minimize errors in luminance levels as caused by quantization errors in code words, especially in regions (e.g., bright areas, dark areas, etc.) of the mapping in which large amounts of errors in luminance levels are prone to occur. In some embodiments, different filters may be used to handle different regions (e.g., bright areas, mid-tone areas, dark areas, etc.) of luminance levels (or their corresponding regions of code words) for a particular type of operation in order to ensure that amounts of errors in those different regions of luminance levels are kept under control. Examples of types of operations for each of which different filters may be used in different regions of luminance levels may include, but are not limited only to, any of subpel interpolation, scaling, deblocking, etc.

A spatial distribution of luminance levels may also be different from a spatial distribution of (e.g., numeric values of, etc.) code values, depending on a degree of non-linearity in a mapping between a set of luminance levels and a set of code words. Consequently, standard deviations in a first set of code values for one or more video coding sequences, one or more pictures, one or more slices, one or more CTUs, one or more CUs, one or more PUs, one or more TUs, one or more blocks in one or more of the foregoing entities, etc., may be different from standard deviations in luminance levels and/or standard deviations in a second different set of code values for the same video coding sequences, pictures, slices, CTUs, CUs, PUs, TUs, blocks, etc.

Techniques as described herein can be configured to apply different prediction methods in different regions of luminance levels, even though numeric values of complexity measures as determined from code words that are used in encoding a video signal may be similar or the same in the different regions of luminance levels, since these numeric values of the complexity measurements may mislead actual image complexities (e.g., in terms of spatial distributions of luminance levels, etc.) in different regions (e.g., bright areas, dark areas, etc.) of luminance levels.

Spectrum characteristics of a video signal that encodes an image with a set of code words that are mapped to a set of luminance levels in a non-linear mapping (e.g., curve, a function, etc.) are different from spectrum characteristics of another video signal that encodes an image with the set of luminance levels. Spectrum characteristics of a video signal that encodes an image with a set of code words may also be different from spectrum characteristics of another video signal that encodes an image with a different set of code words (e.g., luma values, gamma code words, etc.), when the sets of code words are mapped to one or more ranges of luminance levels in different mappings.

A video codec (e.g., an EDR codec, etc.) often performs DCT operations, other operations, etc., in a transform domain (e.g., a frequency domain, etc.). Techniques as described herein can be used to adapt DCT operations, other operations, etc., in a transform domain to different spectrum characteristics exhibited by different types of video signals. For example, DCT transform, DCT quantizer, entropy coding, etc., may be adapted to specific spectrum characteristics exhibited by a specific type of video signal and may operate differently in different regions of luminance levels in accordance with the specific spectrum characteristics exhibited by a specific type of video signal.

As discussed above, a spatial distribution of luminance levels may be different from a spatial distribution of (e.g., numeric values of, etc.) code values, depending on a degree of non-linearity in a mapping between a set of luminance levels and a set of code words.

Techniques as described herein can be configured to adapt interpolation operations to provide relatively accurate interpolation results in different regions of luminance levels. For example, an interpolator under these techniques can take into consideration possible non-linearity of a mapping between a set of luminance levels and a set of code words, and can operate differently based on different slopes/gradients of the mapping at different luminance levels. As a result, an interpolator under techniques as described herein can generate samples with less distortion, for example, in bright areas, dark areas, midtone areas, etc., when interpolating pixels transitioning from a dark area to a bright area.

Luminance-dependent video signal processing operations (e.g., interpolations, predictions, deblocking, etc.) may be implemented in a variety of ways. In some embodiments, luminance-dependent operations are implemented as functions of luminance levels (e.g., average luminance levels as determined for sets of samples in slices, CTUs, CUs, PUs, TUs, blocks, etc.). In some embodiments, a set of luminance levels supported by a video signal (e.g., an EDR video signal, a gamma video signal, a SDR video signal, etc.) may be partitioned into a plurality of (e.g., two, three, four, five, etc.) regions of luminance levels; luminance-dependent video signal processing operations may be implemented as functions of regions of luminance levels (e.g., average luminance levels as determined for sets of samples in slices, CTUs, CUs, PUs, TUs, blocks, etc.). Additionally, optionally, or alternatively, specific relationships, parameters, functions, filters, etc., used in a specific luminance-dependent video signal processing operation in a set of luminance levels and/or in a region of luminance levels may be implemented as functions of regions of luminance levels (e.g., average luminance levels as determined for sets of samples in slices, CTUs, CUs, PUs, TUs, blocks, etc.).

As a result, a signal processing operation as described herein can be optimized based on signal characteristics of different sets of samples in different video coding sequences, different scenes, different pictures, different slices, different CTUs, different CUs, different PUs, different TUs, different blocks, etc., at respective luminance levels in the different sets of samples. In some embodiments, a signal processing operation as described herein can be optimized based on one or more perceptual and/or non-perceptual distortion metrics. Objective metrics may, but are not limited only to, be based on luminance levels, luma values, brightness levels, etc. Non-perceptual distortions may, but are not limited only to, be measured in a metric in terms of luminance levels, luma values, brightness levels, etc. Perceptual distortions may, but are not limited only to, be measured in a metric in terms of code words used by a perceptual quantizer, quanta of human perception in a human perceptual model, etc.

In some embodiments, coding modules (e.g., compression coding modules, prediction modules, deblocking, smoothing, etc.) of a video encoder (e.g., 100 of FIG. 1A, etc.), a video decoder (e.g., 150 of FIG. 1B, etc.), etc., can be configured to generate one or more different types of luminance-dependent operational parameters, functions, filter types, filter coefficients, etc., for one or more different types of signal processing operations. In some embodiments, luminance-dependent operational parameters may include a luminance indicator generated based on luminance levels represented by code words in a set of samples. The value of the luminance indicator for a specific set of samples may be determined based on Y component values of the specific set of samples, code words or luminance levels as mapped from the code words in the specific set of samples, etc. As used herein, a "sample" may refer to a pixel value (e.g., a set of red component value, green component value, and blue component value; a set of Y component value, Cb component value, Cr component value; etc.) as represented by component values of a color space for a pixel in an image or in a portion of an image.

In some embodiments, a video encoder (e.g., a video encoder 100 of FIG. 1A, etc.) can be configured to generate some or all of the different types of luminance-dependent operational parameters, functions, filter types, filter coefficients, etc., and provide them as one or more syntax elements that are encoded into a video signal along with code words representing pixel values of images. For example, the value of a luminance indicator for a specific set of samples may be determined by the video encoder and explicitly signaled within the video signal as a syntax element (e.g., as defined in a standard, a proprietary specification, an extension to a standard, etc.) to a recipient video decoder.

In some embodiments, new coding modules can be added to and existing coding modules can be modified in a video codec to improve coding efficiency in relation to what is specified in a standard. Additionally, optionally, or alternatively, under the same coding condition, coding errors may be minimized in certain regions (e.g., bright areas, midtone areas, dark areas, etc.) of luminance levels. For the purpose of illustration only, specific coding modules may sometimes be used to illustrate one or more aspects of the techniques as described herein. However, it should be noted that the techniques as described herein are not limited to those coding modules and may be similarly applied to other coding modules, other operations, other algorithms, other methods, other syntaxes, etc. For the purpose of illustration only, Y component values in an YCbCr color space may be used to represent or derive luminance levels. However, it should be noted that the techniques as described herein are not limited only to the YCbCr color space and may be similarly applied to other color spaces, or other type of component values (e.g., RGB component values, etc.) other than the Y component values.

4. INTERNAL PRECISION

In some embodiments, a coding module, such as coefficient inverse quantization, inverse spatial transformation, fractional-position motion compensation, interpolation processing in-loop filtering, etc., is configured to operate at different internal precisions for different regions of luminance levels.

For example, the coding module can be configured to operate at a 32 bit internal precision for bright areas of an image and operate at 16 bit internal precision for dark and midtone areas of the image. In some embodiments, an overall luminance level can be derived for a specific set of samples in any of these different luminance areas of the image. Here, the set of samples may correspond to one or more of slices, CTUs, CUs, etc. The determination of the overall luminance level for the specific set of samples may constitute a part of one or more operations (e.g., as performed a video encoder such as 100 of FIG. 1A, a video decoder such as 150 of FIG. 1B, etc.) such as fractional-position motion compensation, interpolation processing, in-loop filtering, etc.

In some embodiments, an overall luminance level for a set of samples can be determined by an upstream device (e.g., video encoder 100 of FIG. 1A, etc.) and explicitly signaled to a downstream device (e.g., a video decoder 150 of FIG. 1B, etc.). Furthermore, the overall luminance level can be signaled to the downstream device with the set of samples at the level of a sequence, scene, picture, slice, LCU, CU, etc. Additionally, optionally, or alternatively, a device such as a video encoder 100 of FIG. 1A, a video decoder 150 of FIG. 1B, etc., can be configured to apply filters adaptively based on code words in the specific set of samples to derive (e.g., mapped, predicted, etc.) the overall luminance level, for example, without explicit signaling the overall luminance level to the device.

An example of explicit signaling is illustrated in TABLE 1. An HEVC coding tree unit syntax as illustrated in TABLE 1 comprises a syntax element, "luminance_idc", which can be added/used to indicate to which region of luminance levels a corresponding coding tree unit or LCU belongs. In an example implementation, the syntax element, "luminance_idc", may comprise 2-bit values, for example, dark or DARK_RANGE ("00"), midtone or MIDTONE_RANGE ("01") or bright or BRIGHT_RANGE ("10").

TABLE 1

| | Descriptor |
|---|---|
| coding_tree_unit( ) { | |
| xCtb = ( CtbAddrInRs % PicWidthInCtbsY ) << CtbLog2SizeY | |
| yCtb = ( CtbAddrInRs / PicWidthInCtbsY ) << CtbLog2SizeY | |
| luminance_idc | ae(v) |
| if( slice_sao_luma_flag \| \| slice_sao_chroma_flag ) | |
| sao( xCtb >> CtbLog2SizeY, yCtb >> CtbLog2SizeY) | |
| Coding_quadtree( xCtb, yCtb, CtbLog2SizeY, 0 ) | |
| } | |

A video coding standard (e.g., HEVC, etc.), a video coding specification, etc., may support signal processing operations for video signals of one, two or more bit depths (e.g., 8 bits, 10 bits, 12 bits, 14 bits, etc.). Under some other approaches, thresholds and values of operational parameters in signal processing operations for video signals of a relatively low bit depth (e.g., 8 bits, 10 bits etc.) are defined in the video coding syntax; thresholds and values of operational parameters in signal processing operations for video signals of relatively high bit depths (e.g., 10 bits, 12 bits, 14 bits, etc.) may be obtained from the thresholds and values of operational parameters in signal processing operations for video signals of a relatively low bit depth (e.g., 8 bits, 10 bits etc.) through bit shifting operations. Under those other approaches, the bit-shifted thresholds and values of operational parameters in signal processing operations for video signals of relatively high bit depths (e.g., 10 bits, 12 bits, 14 bits, etc.) have the same relatively low precisions as those used in signal processing operations for video signals of a relatively low bit depth (e.g., 8 bits, 10 bits etc.). If a video signal (e.g., a 10+ bit SDR signal, etc.) has a very narrow or limited dynamic or luminance range (e.g., <=100 nits, etc.), then no matter what the bit depth (e.g., 8 bits, 10 bits or more, etc.) of the video signal is, using parameters of same precisions for the entire luminance range under these other approaches may not make any difference in terms of causing visual artifacts. However, if a video signal (e.g., a 10+ bit EDR signal, etc.) has a relatively wide dynamic or luminance range (e.g., up to 4,000 nits, up to 20,000+ nits, etc.), then using parameters of same precisions for the entire luminance range may very likely cause visual artifacts in one or more different regions (e.g., dark image areas, bright image areas, etc.) of luminance levels. For example, bit-shifted thresholds and values of operational parameters may not be values optimized for the regions of luminance levels that are prone to generate visual artifacts. As a result, when the bit shifted thresholds and values of operational parameters are used in rendering images from the video signals that support relatively wide dynamic range such as EDR, VDR, etc., the likelihood of visual artifacts in the rendered images is increased significantly.

In contrast, under techniques as described herein, the thresholds and values of operational parameters in signal processing operations for video signals of any of a variety of bit depths (e.g., 8 bits, 10 bits, 12 bits, 14 bits, etc.) may be defined (e.g., in a video coding specification, in a video coding syntax, etc.) and/or programmatically generated (e.g., based on a lookup table, a curve, a mapping, a function, etc.) with different precisions for different regions of luminance levels. If a video signal (e.g., a 10+ bit EDR signal, etc.) has a relatively wide dynamic or luminance range (e.g., up to 4,000 nits, up to 20,000+ nits, etc.), thresholds and operational parameters of different precisions may be used for different regions of luminance levels. For example, thresholds and operational parameters of relatively high precision may be adaptively signaled and/or used for luminance levels (e.g., dark image areas, bright image areas, etc.) determined to be prone to having artifacts. Thresholds and operational parameters of relatively low precision may be adaptively signaled and/or used for luminance levels (e.g., mid-tone image areas, etc.) determined not to be prone to having artifacts. Thus, the techniques as described herein introduces the concept of "luminance level dependence" into video coding operations that process image areas at different luminance levels differently.

The thresholds and values of operational parameters in signal processing operations for video signals of any of a variety of bit depths (e.g., 10 bits, 12 bits, 14 bits, etc.) may be generated by a device that performs the signal processing operations. Additionally, optionally, or alternatively, the thresholds and values of operational parameters in signal processing operations for video signals of any of a variety of bit depths (e.g., 10 bits, 12 bits, 14 bits, etc.) may be generated by an upstream device (e.g., a video encoder 100 of FIG. 1A, etc.) and signaled to a downstream device (e.g., a video decoder 150 of FIG. 1B, etc.) that performs the signal processing operations.

Multiple sets of thresholds and values of operational parameters may be used for multiple regions of luminance levels in signal processing operations for video signals of a specific bit depth (e.g., 8 bits, 10 bits, 12 bits, 14 bits, etc.). A specific set in the multiple sets of thresholds and values of operational parameters may be used to process a set of samples (e.g., a LCU, a CU, etc.) that belongs to a specific region of luminance levels to which the specific set corresponds.

5. INTER-PREDICTION/MOTION COMPENSATION

A video coding standard (e.g., HEVC, etc.), a video coding specification, etc., may specify a set of interpolation filters for inter-prediction, motion compensation, etc. One or more of these interpolation filters can be based on subpel positions. In some embodiments, the set of interpolation filters comprises relatively simple filters (e.g., 4-tap filters, etc.) to be used for filtering non-luminance code words (e.g., chroma, etc.) and relatively complex filters (e.g., 8-tap filters, etc.) to be used for filtering luminance code words. For a specific set of code words (e.g., EDR code words generated by a perceptual quantizer, etc.), a relatively small number of code words may be used to represent/map luminance levels in first image areas (e.g., bright areas of an image, etc.) that belong to specific regions (e.g., high luminance levels, etc.) of luminance levels, as compared with second image areas (e.g., non-bright areas of the same image, etc.) where a relatively large number of code words are available to represent/map luminance levels (e.g., low or medium luminance levels, etc.). To avoid or reduce visual artifacts (e.g., aliasing, etc.), the error tolerance for the first image areas (e.g., the bright areas of the image, etc.) is lower than the error tolerances for the second image areas (e.g., the non-bright areas of the image, etc.).

Under techniques as described herein, different sets of filters with different frequency responses may be used in signal processing operations (e.g., chroma interpolation, etc.) for different regions of luminance levels or in different image areas (e.g., bright areas of an image, non-bright areas of the image, etc.) that correspond to different regions of luminance levels. These different sets of filters may be specifically optimized to avoid or reduce aliasing in different image areas corresponding to different regions of luminance levels. In some embodiments, in the case of EDR code words generated by a perceptual quantizer, longer taps and/or higher precisions of filter coefficients may be configured for filtering the brighter pixels. To avoid switch filters pixel by pixel, the decision for selecting a specific filter with specific filter coefficients can be signaled or derived for a set of samples, for example, at a CU level, a LCU level, a slice level, a picture level, a scene level, a video coding sequence level, etc.

TABLE 2A and TABLE 2B illustrate example switching of chroma interpolation filters based on a luminance indicator ("luminance_idc") at a LCU level.

TABLE 2A

```
/*Check an overall luminance level of a set of samples such as
an LCU, etc. If it belongs to bright, chroma interpolation uses
8 tap filter. Otherwise uses 4 tap interpolation filter.*/
if (luminance_idc == BRIGHT_RANGE)
{
  Apply 8 tap chroma interpolation filter;
}
else
{
  Apply 4 tap chroma interpolation filter;
}
```

TABLE 2B

```
/*Apply trained interpolation filter to a set of samples such as
an LCU, etc.*/
if (luminance_idc == BRIGHT_RANGE)
{
  Apply the interpolation filter trained for bright pixels;
}
else if (luminance_idc == MID_RANGE)
{
  Apply the interpolation filter trained for midtone pixels;
}
else
{
  Apply the interpolation filter trained for dark pixels;
}
```

TABLE 2C

```
/*Filter training algorithm*/
Step 0: set initial trained interpolation filter
Step 1: using trained interpolation filter to find the best
motion vector for each sample in the training sets
Step 2: divide the samples in the training sets into multiple
categories such as dark, midtone and bright, etc.
Step 3: for each category, find the best trained interpolation
filter which minimized a distortion cost between the original
sample and interpolated values.
Step 4: go back to Step 1 until predefined criteria related to
the distortion cost is met.
```

In TABLE 2A, depending on whether a LCU is a bright image area or a non-bright image area as indicated by the luminance indicator (with a value of BRIGHT_RANGE indicating a bright image area), chroma interpolation filters with different number of taps, different precisions of filter coefficients, different frequency responses, etc., can be applied to the LCU.

In TABLE 2B, depending on whether a LCU is a bright image area, a midtone image area or a dark image area as indicated by the luminance indicator (with a value of "01" indicating a midtone image area), chroma interpolation filters with different number of taps, different precisions of filter coefficients, different frequency responses, etc., as trained with a set of training data can be applied to the LCU. TABLE 2C illustrates an example training algorithm to generate filters trained for image areas corresponding to different regions (e.g., bright, midtone, dark, etc.) of luminance levels.

In some embodiments, instead of using a linear filter with respect to code words that represent/map to luminance levels, a non-linear filter that implements luminance compensation is used in signal processing operations such as motion estimation, motion compensation, etc.

When an object is moving in a video sequence, the luminosity of the object may change as lighting at different positions and/or different times may be different. Accordingly, code words representing/mapping to luminance levels of the object also change, for example, non-linearly with respect to the luminance levels (e.g., depending on a non-linear mapping between a set of luminance levels and a set of code words as illustrated in FIG. 2, etc.).

In some embodiments, a filter as described herein may implement one or more of the number of taps, the values of filter coefficients, the frequency response, etc., as one or more functions of luminance levels of neighboring pixels or samples. These functions can be optimized for luminance compensation.

It should be noted that luminance compensation can be applied to other operations. These other operations may include, but are not limited to only: weighted prediction, etc. The weighted prediction may be performed with a combination of zero, one or more linear weights and one or more non-linear weights that are functions of luminance levels (e.g., in a set of samples, in neighboring pixels or samples, in one or more reference samples or pixels used in prediction, etc.).

6. INTRA PREDICTION

To improve intra-frame coding, one or more smoothing filters can be applied before intra prediction. In some embodiments, different types of smoothing filters can be selected for application based on luminance levels of neighboring pixels used for intra prediction. Example smoothing filters may include but are not limited only to, a strong intra smoothing filter used to reduce contour artifacts, a normal intra smoothing filter, etc.

A threshold (e.g., $1<<(\text{bitdepth}-5)$, etc.) related to contour detection may be used to determine whether a specific type of smoothing filter (e.g., a strong intra smoothing filter, etc.) is to be used. In some embodiments, the threshold can be defined as a function of luminance levels. For example, in situations in which contour artifacts are relatively easily observed in certain image areas (e.g., dark and bright regions, etc.), the threshold may be lowered so that a specific type of smoothing filter can be used to for those image areas. Additionally, optionally, or alternatively, a smoothing filter can be configured to use different coefficients/taps according to luminance levels (e.g., of image areas, etc.), since the human visual system has different sensitivities to contouring artifacts in different brightness levels. Additionally, optionally, or alternatively, a smoothing filter can be configured to use taps that cover neighboring pixels or samples of different spatial distances in reference to the filtered pixels or samples. For example, in smooth image areas, a sparse filter that uses pixels or samples from a large spatial area surrounding the filtered pixels or samples but perhaps with little complexity can be deployed to reduce the contouring artifacts.

TABLE 3 illustrates an example of applying different thresholds and/or different smoothing filters based on a luminance indicator (e.g., indicating luminance levels or regions of luminance levels for neighboring pixels or samples, etc.).

TABLE 3

```
/*Check an overall luminance level of a set of
samples such as an LCU, etc. Adapt threshold
and filter based on the overall luminance value.
As used herein, "a << b" denotes that parameter
a is shifted to the left by b digits, which in binary
arithmetic corresponds to multiplying the value
```

TABLE 3-continued

```
of a by 2^b. */
if (luminance_idc == BRIGHT_RANGE)
{
  Threshold = 1 <<(bitdepth-7);
  Apply a sparse filter covering a long range
    of pixels ;
}
else
{
  Threshold = 1 <<(bitdepth-5);
  Apply a different filter other than a sparse filter
    covering a long range of pixels .
}
```

In some embodiments, an intra-prediction of a sample at a pixel located at (x, y) in a block (e.g., a PU, etc.) of an image frame is interpolated with an interpolation expression based on two or more reference samples. The interpolation expression may comprise weighting parameters whose values control respective contributions of the two or more reference samples in the sample that is being intra-predicted based on the linear expression.

In some embodiments, the two or more reference samples can be derived from available samples at pixels in neighboring blocks (e.g., in one or more neighboring PUs, etc.) based on non-linear relationships, functions, curves, etc. Additionally, optionally, or alternatively, values of the weighting parameters may be made dependent on luminance levels. Specifically, the interpolation expression used in intra-predicting a sample based on available reference samples may be luminance compensated for the non-linearity of a mapping between a set of code words (e.g., EDR code words) used to encode a video signal and a set of luminance levels to which the set of code words is mapped.

A first example interpolation expression is shown in the following expression:

$$P_{x,y} = (1 - w_0)R_{top} + w_0 R_{left} \tag{1}$$

where $P_{x,y}$, $R_{top}$, and $R_{left}$ are respectively the sample being predicted, a reference sample computed from a neighboring block above the block containing the pixel at (x, y), and a reference sample computed from a neighboring block on the left of the block containing the pixel at (x, y); and $w_0$ may be a polynomial function of a distance between the location (x, y) and a reference location of a reference sample (e.g., $R_{left}$, etc.). In an example embodiment, $w_0$ may be a second-order polynomial function of the distance as shown in the following expression:

$$w_0 = a_0 + a_1 \cdot d + a_2 \cdot d^2 \tag{2}$$

In some embodiments, the distance in expression (2) may be a relative distance determined based on a ratio of distances to two reference samples such as $R_{top}$, and $R_{left}$, instead of a distance to one of the two reference samples such as $R_{top}$, and $R_{left}$.

In some embodiments, a prediction direction may be determined based on (e.g., relative, average, etc.) luminance levels of the neighboring reference samples used in the interpolation. Parameter $a_0$, $a_1$, and $a_2$ in expression (2) can be configured to use different values—for example, as determined based on one or more of the distance d, the prediction direction, the relative luminance levels of the reference samples, the average luminance levels of the reference samples, etc.—to tackle, or compensate for, the non-linearity in a mapping between the set of code words and the set of luminance levels to which the set of code words is mapped based on the mapping.

A second example interpolation expression is shown in the following expression:

$$P_{x,y} = w_0 + w_1 \cdot R_{top} + w_2 \cdot R_{left} + w_3 \cdot R_{top}^2 + w_4 \cdot R_{left}^2 \tag{3}$$

Expression (3) can be used to predict a sample based on a non-planar surface (e.g., a surface with curvatures depending on values of the additional factors $w_3$ and $w_4$, etc.) that is a second-order polynomial function of neighboring reference samples (e.g., $R_{top}$, $R_{left}$, etc.). Other expressions that include non-first-order terms of reference samples may also be used in various embodiments to predict a sample based on the reference samples.

A third example interpolation expression is the same as expression (1). However, instead of determining a weighting parameter $w_0$ based on expression (2), the weighting parameter $w_0$ can be determined based on other weight parameter expressions other than expression (2). One or more of these other weight parameter expressions may be functions of one or more of distances to one or more reference samples, differences in luminance levels of the reference samples, an average of luminance levels of the reference samples, etc. A non-limiting example of such a weight parameter expression comprises two kernels or functional factors shown as follows:

$$w_0 = f(d) \cdot g\big(Y(R_{top}) - Y(R_{left}),\, Y(R_{top}) + Y(R_{left})/2\big) \tag{4}$$

where the first kernel, f(d), is to address the distance to neighboring reference samples/pixels, and the second kernel, g(x), is to handle, or compensate for, the non-linearity of a mapping between a set of code words (e.g., EDR code words, etc.) and a set of luminance levels to which the set of code words is mapped based on the mapping. In some embodiments, the first kernel, f(d), can, but is not limited only to, be a linear function such as a bi-linear function, etc.; the second kernel, g(x), can, but is not limited only to, be a non-linear function that is correlated with the non-linearity of the mapping.

In addition to, or in place of, polynomials, surfaces, etc., in some embodiments, a look-up table (LUT) may be used. The LUT can be constructed by polynomials, surfaces, other methods, other functions, etc.

7. TRANSFORM, QUANTIZATION AND QP MAPPING

A video coding standard as described herein can specify transform and/or quantization operations with respect to any of a variety of transform sizes such as 4×4, 8×8, 16×16, 32×32, etc.

Instead of using a single set of transform matrix coefficients for one transform size, multiple sets of transform matrix coefficients can be used for one transform size. Each of the multiple sets of transform matrix coefficients corresponds to a specific corresponding region of luminance levels. Similarly, instead of using a single quantization matrix (QM) for one transform size, multiple quantization matrixes can be used for one transform size. Each of the multiple quantization matrixes corresponds to a specific corresponding region of luminance levels.

Under techniques as described herein, values or precisions of transform matrix coefficients may be adjusted based on luminance levels (e.g., regions of luminance levels, etc.). Transform domain coefficients (e.g., frequency domain coefficients, etc.) derived from video signals encoded using different sets (e.g., EDR, SDR, gamma, etc.) of code words can have different distribution patterns in bright areas, midtone areas, dark areas, etc., of the same image. Techniques as described herein can be configured to apply different transforms in different regions (e.g., bright areas, midtone areas, dark areas, etc.) of luminance levels to compact the energy of a set of samples to achieve better compression efficiency for a video signal encoded with a specific set of code words.

In image areas (e.g., dark and bright areas for a video signal encoded with EDR code words) that are prone to have relatively large errors and visual artifacts, transform matrix coefficients with relatively high precisions can be used in a transform matrix to perform transform operations on samples in the image areas. In some embodiments, different sets of transform matrix coefficients with different precisions can be used to perform transform operations for image areas in different regions of luminance levels.

In an example, a transform index can be signaled by an upstream device such as a video encoder 100 of FIG. 1A, etc., as a syntax element to a downstream device such as a video decoder 150 of FIG. 1B, etc. The downstream device selects a specific set of transform matrix coefficients based on the signaled transform index. In another example, (a value of) a luminance indicator can be signaled by an upstream device such as a video encoder 100 of FIG. 1A, etc., as a syntax element to a downstream device such as a video decoder 150 of FIG. 1B, etc. The downstream device selects a specific set of transform matrix coefficients based on the signaled (value of the) luminance indicator, as illustrated in the following table:

TABLE 4

```
/*Check an overall luminance level of a set of samples such as
an LCU, etc. If it belongs to bright areas, use the 14-bit
accuracy transform matrices. Otherwise use 6-bit accuracy
transform matrices. */
if (luminance_idc == BRIGHT_RANGE)
{
  Apply 14-bit accuracy transform matrices;
}
else
{
  Apply 6-bit accuracy transform matrices;
}
```

Similarly, techniques as described herein can be configured to apply different quantization matrixes in different regions (e.g., bright areas, midtone areas, dark areas, etc.) of luminance levels for a video signal encoded with a specific set of code words.

In an example, a quantization matrix index can be signaled by an upstream device such as a video encoder 100 of FIG. 1A, etc., as a syntax element to a downstream device such as a video decoder 150 of FIG. 1B, etc. The downstream device selects a specific quantization matrix based on the signaled quantization matrix index. In another example, (a value of) a luminance indicator can be signaled by an upstream device such as a video encoder 100 of FIG. 1A, etc., as a syntax element to a downstream device such as a video decoder 150 of FIG. 1B, etc. The downstream device selects a specific quantization matrix based on the signaled (value of the) luminance indicator.

Instead of using a single QP mapping table that maps a set of qPi values (e.g., luma QP values, etc.) to a set of Qpc values (e.g., chroma QP values, etc.), multiple QP mapping tables can be used under techniques as described herein. Each of the multiple QP mapping tables corresponds to a region of luminance levels and can be used for mapping a set of qPi values (e.g., luma QP values, etc.) to a set of Qpc values (e.g., chroma QP values, etc.) in the corresponding region of luminance levels.

In some embodiments, none of the multiple QP mapping tables is signaled but rather is preconfigured or stored. In some embodiments, at least one of the multiple QP mapping tables is signaled from an upstream device (e.g., a video encoder 100 of FIG. 1A, etc.) to a downstream device (e.g., a video decoder 150 of FIG. 1B, etc.). In some embodiments, at least one of the multiple QP mapping tables is preconfigured or stored.

An example QP mapping table used for bright areas is shown as follows:

TABLE 5

| qPi | <25 | 25 | 26 | 27 | 28 | 29 | 30 | 31 | 32 | 33 | 34 | 35 | 36 | 37 | 38 | >38 |
|---|---|---|---|---|---|---|---|---|---|---|---|---|---|---|---|---|
| $Qp_C$ | =qPi | 24 | 25 | 26 | 27 | 28 | 28 | 29 | 29 | 30 | 30 | 31 | 31 | 32 | 32 | =qPi − 6 |

An example QP mapping table used for midtone and dark areas is shown as follows:

TABLE 6

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_C$ | =qPi | 29 | 30 | 31 | 32 | 33 | 33 | 34 | 34 | 35 | 35 | 36 | 36 | 37 | 37 | =qPi − 6 |

In some embodiments, at least one of the multiple QP mapping tables is generated by applying chroma QP offsets to another of the multiple QP mapping tables. For example, multiple chroma QP offsets can be signaled with a slice header shown in the following table:

TABLE 7

| | Descriptor |
|---|---|
| slice_segment_header( ) { | |
| first_slice_segment_in_pic_flag | u(1) |

TABLE 7-continued

| | Descriptor |
|---|---|
| .... | se(v) |
| if( pps_slice_chroma_qp_offsets_present_flag ) { | |
| for( i = 0; i < number of regions of luminance levels; i++){ | |
| slice_cb_qp_offset [ i ] | se(v) |
| slice_cr_qp_offset [ i ] | se(v) |
| } | |
| } | |
| .... | |

In some embodiments, the number of regions of luminance levels is 3; chroma QP offsets (for Cb and Cr) are (−2, −2) for dark areas, (0, 0) for midtone areas, and (−5,−5) for bright areas. These offset values may be applied to a reference QP mapping table (e.g., a midtone chroma QP mapping table) to generate one or more new QP mapping tables (e.g., a dark chroma QP mapping table, a bright chroma QP mapping table, etc.).

In some embodiments, a luminance indicator can be used to select which QP mapping table among the multiple QP mapping tables, as illustrated in the following table:

TABLE 8

```
/*Check an overall luminance level of a set of samples such as
an LCU, etc. If it belongs to bright or bright areas, use Table
5. Otherwise use Table 6.*/
if (luminance_idc == BRIGHT_RANGE)
{
  QpC is derived based on Table 5;
}
else
{
  QpC is derived based on Table 6;
}
```

8. ENTROPY CODING

A video coding standard as described herein can specify entropy coding such as CABAC, CAVLC, etc., for video signal compression.

CABAC may employ engines such as binarization, context modeling, arithmetic coding, etc. In some embodiments, instead of using a single set of context for CABAC, multiple sets of context can be used in CABAC. Each of the multiple sets of context corresponds to a corresponding region of luminance levels, and maintains a set of statistics of probability modes for the corresponding region of luminance levels. As statistics of recently coded data symbols, DCT coefficients, etc, can vary among different regions of luminance levels, techniques as described herein can be configured to maintain different sets of statistics of probability modes in different sets of context for different regions of luminance levels and select different sets of context in different regions (e.g., bright areas, midtone areas, dark areas, etc.) of luminance levels to reduce interference in different statistical patterns of code words in the different regions of luminance levels and to increase coding efficiency in CABAC.

To allow parsing and decoding independently in different regions of luminance levels, one or more syntax elements that can (explicitly or implicitly) differentiate different sets of context in the different regions of luminance levels may be signaled at one of various levels such as CU, LCU, slice, and other levels. In an example, a context index can be signaled by an upstream device such as a video encoder 100 of FIG. 1A, etc., as a syntax element to a downstream device such as a video decoder 150 of FIG. 1B, etc. The downstream device selects a specific set of context based on the signaled context index. In another example, (a value of) a luminance indicator can be signaled by an upstream device such as a video encoder 100 of FIG. 1A, etc., as a syntax element to a downstream device such as a video decoder 150 of FIG. 1B, etc. The downstream device selects a specific set of contexts based on the signaled (value of the) luminance indicator, as shown in the following table:

TABLE 9.1

```
/*CABAC context selection based on decoded value of
luminance_idc.
Step 1: decode syntax luminance_idc
Step 2: context selection is based on value of luminance_idc
*/
if (luminance_idc == BRIGHT_RANGE)
{
  Select context designed for bright area(s);
}
else if (luminance_idc == MIDTONE_RANGE)
{
  Select context designed for midtone area(s);
}
else
{
  Select context designed for dark area(s);
}
```

For Huffman coding (e.g., CAVLC, etc.), instead of using a single variable length code table, multiple variable length code tables can be used in Huffman coding. Each of the multiple variable length code tables corresponds to a corresponding region of luminance levels, and is constructed based on estimated probabilities of occurrences of possible values of source symbols for the corresponding region of luminance levels. As estimated probabilities of occurrences of possible values of source symbols for the corresponding region of luminance levels can vary among different regions of luminance levels, different variable length code tables can be configured to maintain different estimated probabilities of occurrences of possible values of source symbols for different regions of luminance levels and can be selected based on different regions (e.g., bright areas, midtone areas, dark areas, etc.) of luminance levels to reduce interference in different estimated probabilities of occurrences of possible values of source symbols in the different regions of luminance levels and to increase coding efficiency in Huffman coding (e.g., CAVLC, etc.).

To allow parsing and decoding independently in different regions of luminance levels, one or more syntax elements that can (explicitly or implicitly) differentiate different variable length code tables in the different regions of luminance levels may be signaled at one of various levels such as CU, LCU, slice, and other levels. In an example, a table indicator can be signaled by an upstream device such as a video encoder 100 of FIG. 1A, etc., as a syntax element to a downstream device such as a video decoder 150 of FIG. 1B, etc. The downstream device selects a specific variable length code table based on the signaled table indicator. In another example, (a value of) a luminance indicator can be signaled by an upstream device such as a video encoder 100 of FIG. 1A, etc., as a syntax element to a downstream device such as a video decoder 150 of FIG. 1B, etc. The downstream device selects a specific variable length code table based on the signaled (value of the) luminance indicator, as shown in the following table:

TABLE 9.2

```
/*Huffman coding or CAVLC table selection based on
decoded value of luminance_idc.
Step 1: decode syntax luminance_idc
Step 2: table selection is based on value of luminance_idc */
if (luminance_idc == BRIGHT_RANGE)
{
  Select variable length code table designed for bright
area(s);
}
else if (luminance_idc == MIDTONE_RANGE)
{
  Select variable length code table designed for midtone
area(s);
}
else
{
  Select variable length code table designed for dark area(s);
}
```

It has been described that entropy coding methods such as arithmetic coding (e.g., CABAC, etc.) and Huffman coding (e.g., CAVLC, etc.) can operate differently in different regions of luminance levels. It should be noted that this is for the purpose of illustration only. In various embodiments, entropy coding (e.g., Golomb coding, etc.) other than arithmetic coding and Huffman coding can also operate with dependence on luminance levels of image areas in images.

9. DEBLOCKING

A video coding standard may specify optimal values of parameters for operations such as deblocking, etc. These optimal values may be obtained or finely tuned using one or more sets of perceptual tests for a specific type of video signal such as SDR video signals. However, the optimal values obtained or finely tuned with a first type of video signals such as SDR video signals, etc., may not work well in all luminance levels for a second different type of video signals such as EDR video signals, etc. For example, deblocking may use operational parameters such as beta and Tc (e.g., defined in a video coding standard such as HEVC, etc.) to determine whether deblocking should be applied to a set of samples in a CTU, a CU, a block, etc., whether a strong deblocking filter should be applied to the set of samples, whether a normal deblocking filer should be applied to the set of samples, etc.

Instead of using a single set of operational parameter values for deblocking, multiple sets of operational parameter values for deblocking can be used under techniques as described herein. Each of the multiple sets of operational parameter values for deblocking corresponds to a region of luminance levels and can be used for determining whether deblocking should be applied to a set of samples in a CTU, a CU, a block, etc., whether a strong deblocking filter should be applied to the set of samples, whether a normal deblocking filer should be applied to the set of samples, etc., in the corresponding region of luminance levels.

In some embodiments, none of the multiple sets of operational parameter values for deblocking is signaled but rather is preconfigured or stored. In some embodiments, at least one of the multiple sets of operational parameter values for deblocking is signaled from an upstream device (e.g., a video encoder 100 of FIG. 1A, etc.) to a downstream device (e.g., a video decoder 150 of FIG. 1B, etc.). In some embodiments, at least one of the multiple sets of operational parameter values for deblocking is preconfigured or stored.

In some embodiments, at least one of the multiple sets of operational parameter values for deblocking is generated by applying operational parameter value offsets to another of the multiple sets of operational parameter values for deblocking. For example, multiple operational parameter value offsets can be signaled with a slice header shown in the following table:

TABLE 9.3

| | Descriptor |
|---|---|
| slice_segment_header( ) { | |
| first_slice_segment_in_pic_flag | u(1) |
| .... | se(v) |
| if( !slice_deblocking_filter_disabled_flag ) { | |
| for( i = 0; i < number_of_regions_of_luminance_values; i++){ | |
| slice_beta_offset_div2[i] | se(v) |
| slice_tc_offset_div2[i] | se(v) |
| } | |
| } | |
| .... | |

In some embodiments, the number of regions of luminance levels is 3; deblocking operational parameter value offsets (for Cb and Cr) are (0, 0) for dark and midtone areas, and (2, 2) for bright areas. These operational parameter values may be applied to a reference set of deblocking operational parameter values to generate one or more new sets of deblocking operational parameter values (e.g., in dark areas, in midtone areas, in bright areas, etc.).

10. SAMPLE ADAPTIVE OFFSET

SAO filtering applies local processing to one or more pixels depending on samples or pixel values of local neighborhood pixels of the one or more pixels. The local processing applied by the SAO filtering conditionally adds an offset value to decoded samples at the one or more pixels following deblocking operations applied to the one or more pixels. The SAO filtering operates in two modes: a band offset mode, which aims at removing banding artifacts; and an edge offset mode, which aims at smoothing edges.

In the band offset mode, the full amplitude range of samples (e.g., Y values, code words in the Y component of a YCbCr color space, etc.) is uniformly split into a plurality of (e.g., 32, etc.) segments denoted as bands. Samples belonging to a subset (e.g., four consecutive bands within a total of 32 bands, etc.) of sets in the plurality of bands can be modified by adding band offsets transmitted with the samples in a video signal.

Banding artifacts may be easily observed in certain regions (e.g., dark and bright areas, etc.) of luminance levels in a specific type of video signal (e.g., an EDR signal, etc.). Instead of splitting/dividing the full range of samples into a plurality of uniform bands, non-uniform bands can be used to divide the full range of samples for SAO filtering. In some embodiments, the full range of samples may be divided into bands for SAO filtering in a manner that is luminance dependent. In an example, lengths for bands corresponding to error-prone image areas are reduced (e.g., a relatively high density of bands in the error-prone image areas, etc.). In comparison, lengths for bands corresponding to less error-prone image areas are increased (e.g., a relatively low density of bands in the less error-prone image areas, etc.). TABLE 10 illustrates example non-uniform division of an amplitude range of samples into bands for SAO filtering in a luminance dependent manner.

TABLE 10

Figures 3A, 3B:
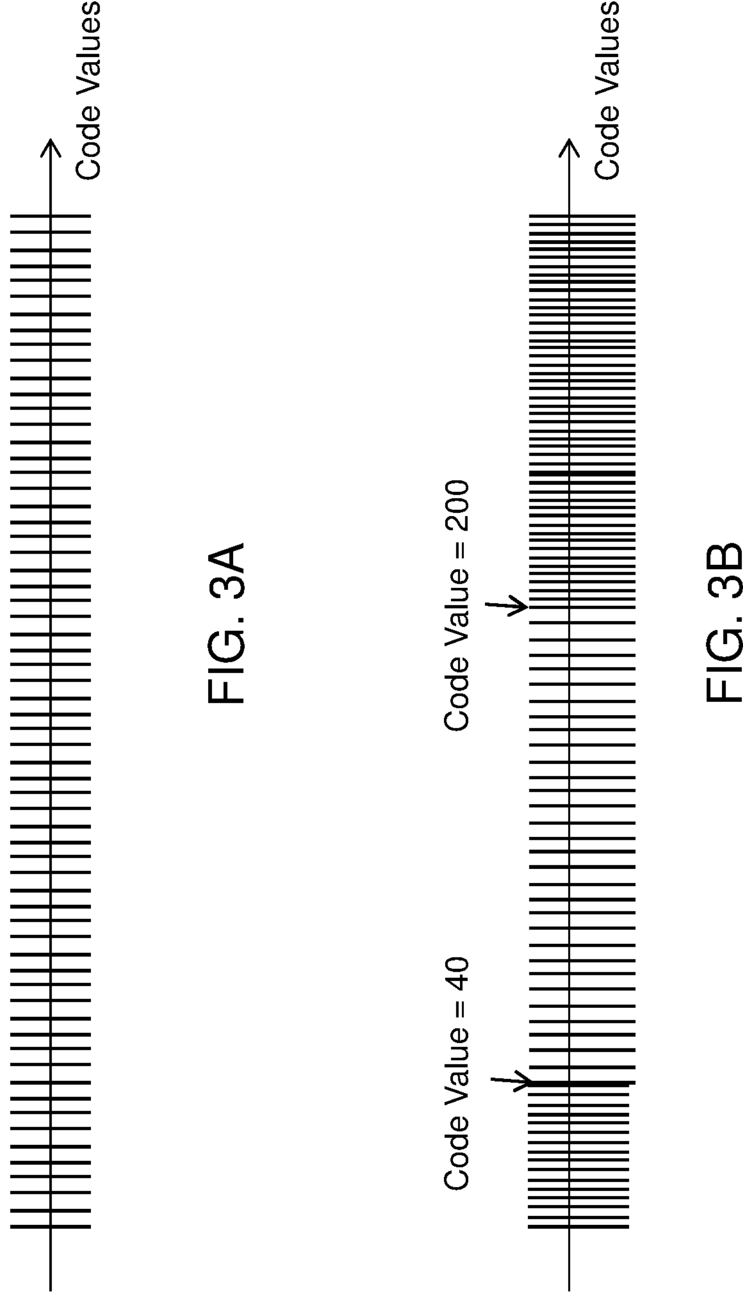
FIG. 3A and FIG. 3B illustrate example SAO band divisions.

```
/* Use a 10 bit code space for (e.g., Y, luminance-related,
etc.) code words as an example. Total number of code words
is 1024. Instead of using 32 uniformly split bands as
illustrated in FIG. 3A, bands are assigned non-uniformly
based on luminance levels as illustrated in FIG. 3B. 10 bit
code word 40 is used as the boundary for dark area and
midtone, 10 bit code word 200 is used as the boundary for
midtone and highlight area. The total number of bands is, for
example, 58. Offset values in a subset (e.g., 4) of bands may
be sent.*/
if (codeword_value < (40 <<(bitdepth-8)))
{
  segment_length = 4 <<(bitdepth-8);
  num_bands = 10;
  offset_value =
    sao_offset_abs <<(bitDepth−Min(bitDepth, 10));
}
else if (codeword_value < (200 <<(bitdepth-8)))
{
  segment_length = 8 <<(bitdepth-8) ;
  num_bands = 20;
  offset_value =
    sao_offset_abs << (bitDepth−Min(bitDepth, 10));
}
else
{
  segment_length = 2 <<(bitdepth-8);
  num_bands = 28;
  offset_value = sao_offset_abs;
}
```

In an example, band offset and edge offset values used by SAO operations for a video signal can be directly signaled, or alternatively preconfigured.

11. DE-BANDING FILTERING

Techniques can be configured to apply de-banding filtering in place of, or in conjunction with, SAO filtering as defined in a video coding standard such as HEVC, etc. The de-banding filtering may be configured to support relatively sophisticated nonlinear filtering. In a video signal such as one encoded with a perceptual quantizer, etc., banding/contouring artifacts may be relatively easily perceived even with small prediction and quantization errors (e.g., in terms of code words generated by the perceptual quantizer, etc.) in certain image areas. In addition, the banding/contouring artifacts can increase when improved prediction methods are used (e.g., in HEVC intra prediction, etc.) to generate relatively effective prediction and minimize residues in code words, as it is relatively difficult to differentiate luminance levels with the residues varying within relatively small ranges.

In some embodiments, de-banding filtering as described herein can be used to remove or reduce directional contour artifacts inside a set of samples in a CTU, a CU, a block, etc.

In some embodiments, a downstream device may be explicitly or implicitly signaled as to what de-banding algorithms, which set of de-banding operational parameter values, etc., are to be used for a set of samples. For example, a luminance indicator ("luminance_idc") can be signaled to the downstream device. The downstream device may be configured to select and perform one or more specific de-banding algorithms with specific de-banding operational parameter values, etc., with relatively little complexity as compared with the upstream device as the downstream device may not perform rate distortion optimization.

12. OTHER EXAMPLE OPERATIONS

Operations other than mentioned in the foregoing discussion may also be used by a device as described herein. For example, since an EDR video signal is quite different from an SDR video signal, additional operations can be used to further improve coding efficiencies of the EDR video signal, the SDR video signal, etc. A non-limiting example, an operation such as residue reshaping, etc., may be placed/performed before transform and quantization operations in a video encoder 100 of FIG. 1A, etc. Correspondingly, an inverse operation such as inverse residue reshaping, etc., may be placed/performed after inverse quantization and inverse transform at a video decoder 150 of FIG. 1B. In one embodiment, residue reshaping may be a luminance-dependent function that depends on underlying luminance levels of a corresponding set of samples from which prediction is made. At a video decoder such as 150 of FIG. 1B, the underlying luminance level can be retrieved from the set of samples as intra predicted or motion compensated, or alternatively signaled explicitly from a video encoder such as 100 of FIG. 1A to a video decoder such as 150 of FIG. 1B. In some embodiments, to reduce complexity, residue reshaping functions and their underlying luminance levels can be computed (e.g., by a video encoder 100 of FIG. 1A, etc.) at a level of CU, LCU, slice, picture, scene, video coding sequence, etc. In a non-limiting example, a piecewise linear expression may be used to represent a residue reshaping function with pivots of the piecewise linear expression controlled by a luminance indicator ("luminance_idc").

Since a high dynamic range video signal such as an EDR video signal supports a much higher dynamic range than other video signals such as SDR, etc., banding/contour artifacts in the high dynamic range may be more announced than the other video signals. A sparse filter may be used to remove or reduce banding/contour in the high dynamic range video signal. Some examples of sparse filters are described in the U.S. Provisional Patent Application with Ser. No. 61/885,377, filed on Oct. 1, 2013, titled "HARDWARE EFFICIENT SPARSE FIR FILTERING IN VIDEO CODEC," incorporated herein by reference in its entirety.

13. EXAMPLE PROCESS FLOWS

Figure 4A:
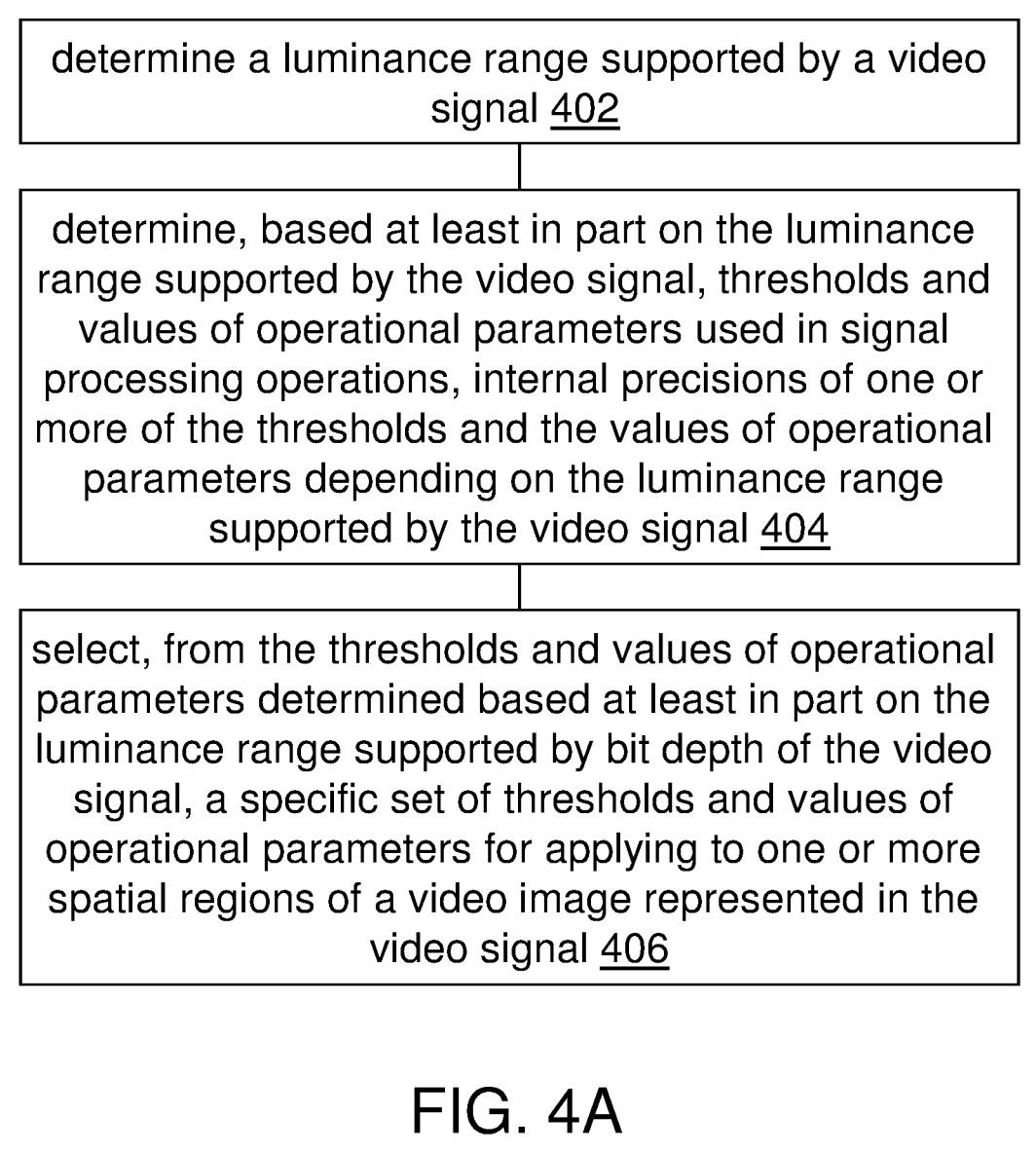

FIG. 4A illustrates an example process flow according to an example embodiment of the present invention. In some example embodiments, one or more computing devices or components may perform this process flow. In block 402, a video codec (e.g., a video encoder 100 of FIG. 1A, a video decoder 150 of FIG. 1B, etc.) determines a luminance range (or dynamic range) supported by a (e.g., received, etc.) video signal.

In block 404, the video codec determines, based at least in part on the luminance range supported by the video signal, thresholds and values of operational parameters used in one or more signal processing operations. Internal precisions of one or more of the thresholds and the values of operational parameters depend on the luminance range supported by the video signal.

In block 406, the video codec selects, from the thresholds and values of operational parameters determined based at least in part on the luminance range supported by the video signal, a specific set of thresholds and values of operational parameters for applying to one or more spatial regions of a video image represented in the video signal. The one or more spatial regions of the video image correspond to a specific region of luminance levels, the specific set of thresholds and values of operational parameters corresponding to the same specific region of luminance levels.

Figure 4B:
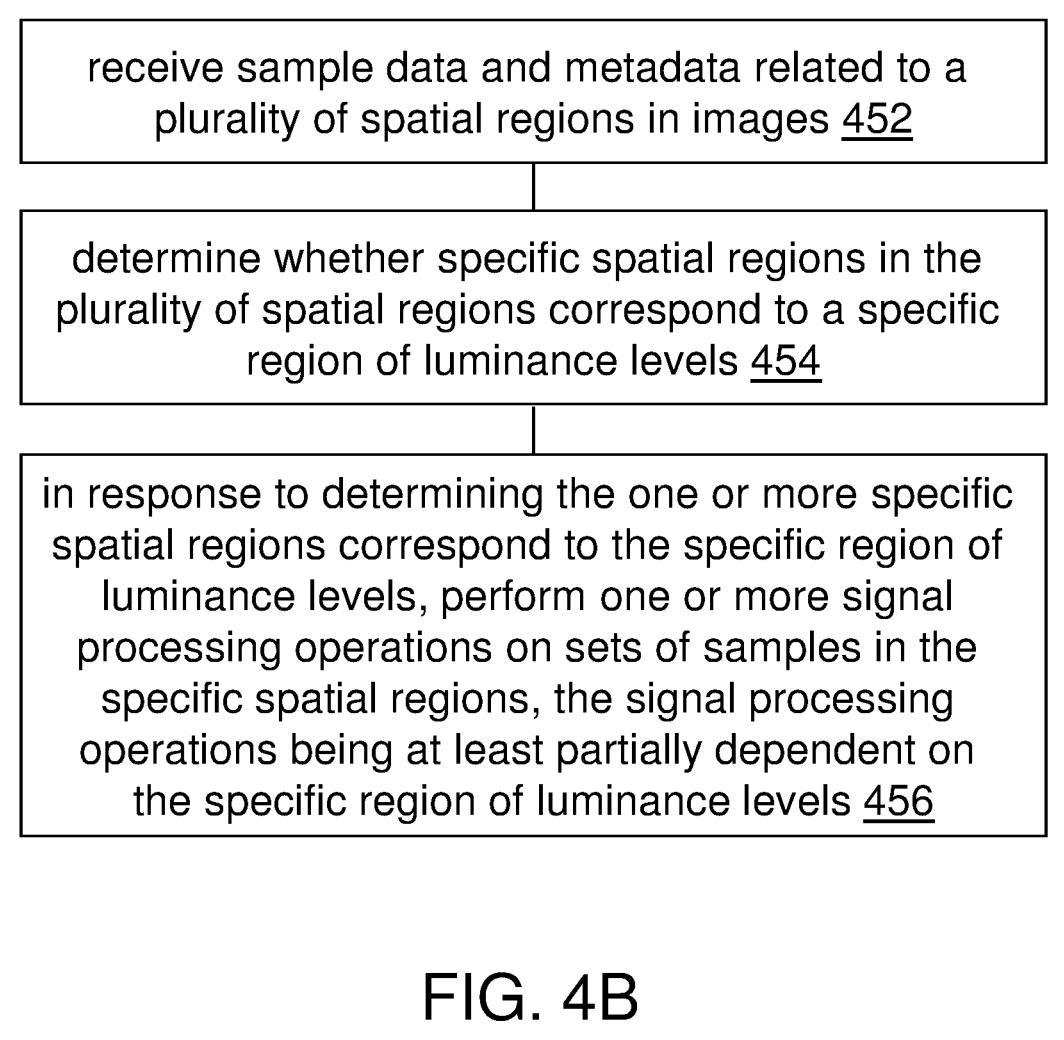

FIG. 4B illustrates an example process flow according to an example embodiment of the present invention. In some example embodiments, one or more computing devices or components may perform this process flow. In block 452, a video codec (e.g., a video encoder 100 of FIG. 1A, a video decoder 150 of FIG. 1B, etc.) receives, in reference with a video signal, sample data and metadata related to a plurality of spatial regions in one or more images.

In block 454, the video codec determines whether one or more specific spatial regions in the plurality of spatial regions correspond to a specific region of luminance levels.

In block 456, in response to determining the one or more specific spatial regions correspond to the specific region of luminance levels, the video codec performs one or more signal processing operations on one or more sets of samples in the one or more specific spatial regions. The one or more signal processing operations are at least partially dependent on the specific region of luminance levels.

In an embodiment, the one or more signal processing operations include performing interpolation filtering on at least one of the one or more sets of samples with an interpolation filter selected based at least in part on the specific region of luminance levels.

In an embodiment, the one or more signal processing operations include performing smoothing filtering on at least one set of the one or more sets of samples with a smoothing filter selected based at least in part on the specific region of luminance levels. In an embodiment, the smoothing filter represents one of a strong smoothing filter, a sparse finite impulse response filter, a smoothing filter covering more than 50 neighboring pixels, a smoothing filter covering no more than 50 neighboring pixels, or a normal smoothing filter. In an embodiment, the smoothing filter is a specific smoothing filter selected, from a plurality of deployed smoothing filters, based on a threshold that is dependent on the specific region of luminance levels.

In an embodiment, the one or more signal processing operations include performing weighted intra prediction on at least one set of the one or more sets of samples with one or more weight parameters whose values are selected based at least in part on the specific region of luminance levels.

In an embodiment, the one or more weight parameters comprise one or more of polynomial expressions dependent on a distance to a reference sample, surface-based expressions dependent at least in part on second-order values of reference samples, luminance-dependent functions, or functions comprising a first kernel dependent on luminance levels and a second kernel dependent on a distance to a reference sample.

In an embodiment, the one or more signal processing operations include performing a transform operation on at least one set of the one or more sets of samples with a set of transform matrix coefficients that is selected from a plurality of sets of transform matrix coefficients based at least in part on the specific region of luminance levels.

In an embodiment, the one or more signal processing operations include performing a quantization operation on at least one set of the one or more sets of samples with a quantization matrix that is selected from a plurality of quantization matrixes based at least in part on the specific region of luminance levels.

In an embodiment, the one or more signal processing operations include performing a quantization operation on chroma components in at least one set of the one or more sets of samples with a quantization parameter derived from a quantization parameter mapping table that is selected from a plurality of quantization parameter mapping tables based at least in part on the specific region of luminance levels.

In an embodiment, the one or more signal processing operations include performing an entropy encoding operation on at least one set of the one or more sets of samples with a set of context that is selected from a plurality of sets of context based at least in part on the specific region of luminance levels, and wherein the set of context is related to probability models of symbols corresponding to the specific region of luminance levels.

In an embodiment, the one or more signal processing operations include performing a deblocking operation on at least one set of the one or more sets of samples that is enabled by a set of deblocking operational parameters whose values are selected based at least in part on the specific region of luminance levels.

In an embodiment, the one or more signal processing operations include performing sample adaptive offset (SAO) filtering on at least one set of the one or more sets of samples with one or more offset values that are selected based at least in part on the specific region of luminance levels, and where in the one or more offset values are of precisions dependent on the specific region of luminance levels.

In an embodiment, the one or more signal processing operations include performing debanding filtering on at least one set of the one or more sets of samples with one or more debanding operational parameters values that are selected based at least in part on the specific region of luminance levels.

FIG. 4C illustrates an example process flow according to an example embodiment of the present invention. In some example embodiments, one or more computing devices or components may perform this process flow. In block 482, a video codec (e.g., a video encoder 100 of FIG. 1A, a video decoder 150 of FIG. 1B, etc.) analyzes the statistics of a video signal.

In block 484, the video codec determine, based at least in part on one or more luminance levels of image regions of decoded images of the video signal, thresholds and values of operational parameters used in signal processing operations, internal precisions of one or more of the thresholds and the values of operational parameters depending on the luminance region of the video signal.

In block 686, the video codec determine filter parameters for a sparse finite-impulse-response (FIR) filter.

In various example embodiments, an encoder, a decoder, a system, an apparatus, or one or more other computing devices performs any or a part of the foregoing methods as described.

Note that, although separate embodiments are discussed herein, any combination of embodiments and/or partial embodiments discussed herein may be combined to form further embodiments.

14. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
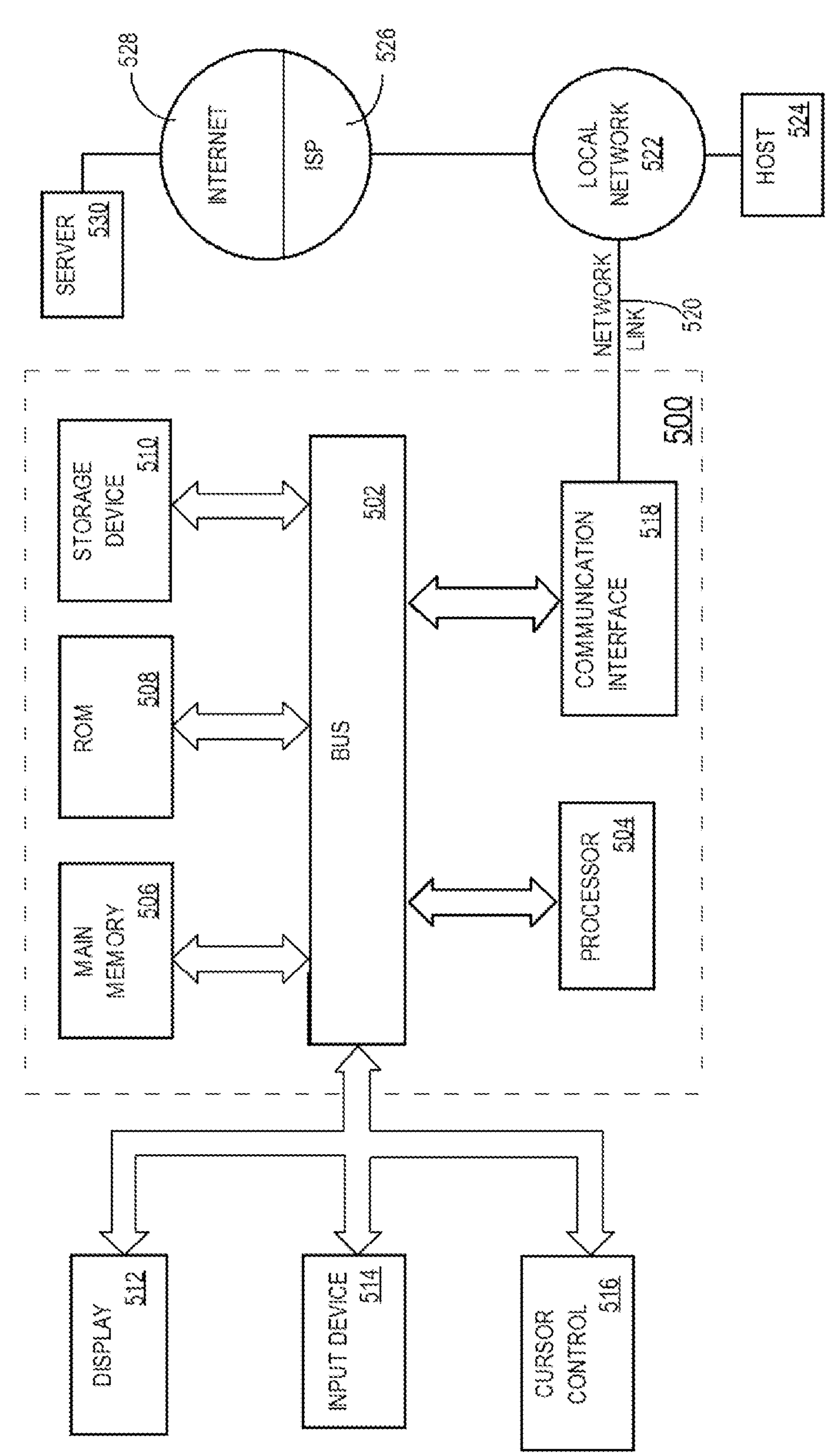
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

15. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for processing a spatial region of a video image represented in a video signal, the apparatus comprising:

an input for receiving an input image in a video bitstream comprising luminance and chroma pixel values; and a processor, wherein the processor:

determines a luminance indicator of a spatial image region in the input image based on a plurality of luminance pixel values in the spatial image region, wherein the luminance indicator indicates that a specific partition corresponds to a specific range of luminance levels within two or more ranges of luminance levels in the spatial image region;

determines one or more filtering parameters for a deblocking filter, wherein the filtering parameters depend on the luminance indicator in the spatial image region; and applies the deblocking filter to the spatial image region to generate a filtered image region, wherein the deblocking filter with the one or more filtering parameters is applied to filter the plurality of luminance pixel values in the spatial image region to generate a plurality of filtered luminance pixel values in the filtered image region.

2. The apparatus of claim 1 wherein the luminance indicator is determined based on an average of the plurality of luminance pixel values in the spatial image region.

3. The apparatus of claim 1, wherein a parameter from the one or more filtering parameters for the deblocking filter comprises an offset to another operational parameter for deblocking.

4. The apparatus of claim 1, wherein the processor further determines, based at least in part on the luminance indicator, values of operational parameters used in one or more signal processing operations related to the spatial image region of the input image.

5. The apparatus of claim 4, wherein a determined operational parameter used in signal processing operations related to the spatial image region of the input image comprises an offset to another operational parameter for deblocking.

6. The apparatus of claim 1, wherein the deblocking filter is selected from a first deblocking filter or a second deblocking filter stronger than the first deblocking filter based on the luminance indicator.

7. The apparatus of claim 4, wherein the one or more signal processing operations include performing a smoothing operation on pixels in the spatial image region that is enabled by a set of smoothing operational parameters whose values are selected based at least in part on the two or more ranges of luminance levels.

* * * * *